(12) United States Patent
Liu et al.

(10) Patent No.: US 12,255,341 B2
(45) Date of Patent: Mar. 18, 2025

(54) END CAP ASSEMBLY, BATTERY CELL, BATTERY, BATTERY CELL MANUFACTURING EQUIPMENT AND METHOD

(71) Applicant: CONTEMPORARY AMPEREX TECHNOLOGY (HONG KONG) LIMITED, Hong Kong (CN)

(72) Inventors: Yanyu Liu, Ningde (CN); Shoujun Huang, Ningde (CN); Xinxiang Chen, Ningde (CN); Yulian Zheng, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 687 days.

(21) Appl. No.: 17/540,386

(22) Filed: Dec. 2, 2021

(65) Prior Publication Data

US 2022/0209341 A1 Jun. 30, 2022

Related U.S. Application Data

(63) Continuation of application No. PCT/CN2020/142376, filed on Dec. 31, 2020.

(51) Int. Cl.
*H01M 50/15* (2021.01)
*H01M 50/103* (2021.01)
(Continued)

(52) U.S. Cl.
CPC ......... *H01M 50/15* (2021.01); *H01M 50/103* (2021.01); *H01M 50/209* (2021.01);
(Continued)

(58) Field of Classification Search
CPC .. H01M 50/15; H01M 50/103; H01M 50/209; H01M 50/528; H01M 50/543;
(Continued)

(56) References Cited

U.S. PATENT DOCUMENTS

| | | | |
|---|---|---|---|
| 8,323,813 | B2 | 12/2012 | Byun et al. |
| 8,614,018 | B2 | 12/2013 | Byun et al. |

(Continued)

FOREIGN PATENT DOCUMENTS

| | | |
|---|---|---|
| CN | 101887986 A | 11/2010 |
| CN | 103325986 A | 9/2013 |

(Continued)

OTHER PUBLICATIONS

English translation of CN209766541.*
(Continued)

*Primary Examiner* — Kiran Quraishi Akhtar
(74) *Attorney, Agent, or Firm* — Scully, Scott, Murphy & Presser, P.C.

(57) ABSTRACT

An end cap assembly, a battery cell, a battery, battery cell manufacturing equipment and method are provided, which belong to the technical field of batteries. The end cap assembly includes an end cap, an electrode terminal and a connector. The end cap is provided with an electrode lead-out hole which penetrates the end cap in a thickness direction of the end cap. The connector is configured to connect the end cap to fix the electrode terminal. The electrode terminal is provided opposite to the electrode lead-out hole, and a projection of the electrode terminal in the thickness direction does not overlap with a projection of the end cap in the thickness direction, thus a radial size of the electrode terminal is smaller, which reduces the space occupied by the electrode terminal, saves material and has better economy.

17 Claims, 10 Drawing Sheets

(51) Int. Cl.
*H01M 50/209* (2021.01)
*H01M 50/528* (2021.01)
*H01M 50/543* (2021.01)

(52) U.S. Cl.
CPC ....... *H01M 50/528* (2021.01); *H01M 50/543* (2021.01); *H01M 2220/20* (2013.01)

(58) Field of Classification Search
CPC .. H01M 50/531; H01M 50/553; H01M 50/55; H01M 2220/20; Y02E 60/10
See application file for complete search history.

(56) References Cited

U.S. PATENT DOCUMENTS

| | | | |
|---|---|---|---|
| 8,974,953 | B2 | 3/2015 | Byun et al. |
| 9,023,517 | B2 | 5/2015 | Kim et al. |
| 9,306,197 | B2 | 4/2016 | Byun et al. |
| 10,084,164 | B2 | 9/2018 | Guen et al. |
| 2010/0291421 | A1 | 11/2010 | Byun et al. |
| 2011/0183165 | A1 | 7/2011 | Byun et al. |
| 2011/0183198 | A1 | 7/2011 | Byun et al. |
| 2013/0071704 | A1 | 3/2013 | Byun et al. |
| 2013/0252078 | A1* | 9/2013 | Kim .................. H01M 50/553 429/179 |
| 2017/0040579 | A1 | 2/2017 | Guen et al. |
| 2020/0144584 | A1 | 5/2020 | Zeng et al. |

FOREIGN PATENT DOCUMENTS

| | | | |
|---|---|---|---|
| CN | 104377337 A | 2/2015 | |
| CN | 110176558 A | 8/2019 | |
| CN | 209766541 * | 12/2019 | ............ Y02E 60/10 |
| CN | 209766541 U | 12/2019 | |
| CN | 111162205 A | 5/2020 | |
| CN | 214254642 U | 9/2021 | |
| EP | 3651229 A1 | 5/2020 | |
| EP | 3651229 B1 | 12/2020 | |
| JP | 2010267615 A | 11/2010 | |
| JP | 2013197102 A | 9/2013 | |
| JP | 2019153379 A | 9/2019 | |
| JP | 2020163248 A | 10/2020 | |
| JP | 2022055684 A | 4/2022 | |
| KR | 10-2016-0088367 A | 7/2016 | |
| KR | 10-2016-100088367 A | 7/2016 | |

OTHER PUBLICATIONS

Decision to Grant a Patent dated Apr. 15, 2024 received in Japanese Patent Application No. JP 2022-560373.
First Office Action dated Jun. 21, 2024 received in Chinese Patent Application No. CN 202080101601.5.
Notice of Reasons for Refusal dated Nov. 13, 2023 received in Japanese Patent Application No. JP 2022-560373.
Extended European Search Report dated Oct. 25, 2022 received in European Patent Application No. EP 20937167.3.
Notice of Allowance dated Oct. 30, 2024 received in the Korean Intellectual Property Office for Patent Application No. 10-2023-7008447 together with an English language translation.

* cited by examiner

END CAP ASSEMBLY, BATTERY CELL, BATTERY, BATTERY CELL MANUFACTURING EQUIPMENT AND METHOD

CROSS-REFERENCE TO RELATED APPLICATIONS

This application is a continuation of International Application No. PCT/CN2020/142376, filed on Dec. 31, 2020, the disclosure of which is hereby incorporated by reference in its entirety.

FIELD OF TECHNOLOGY

The present application relates to the technical field of batteries, in particular, relates to an end cap assembly, a battery cell, a battery, and battery cell manufacturing equipment and method.

BACKGROUND

At present, lithium-ion batteries are commonly used in vehicles. As a rechargeable battery, lithium-ion batteries have the advantages of small size, high energy density, high power density, multiple recycling times and long storage time.

The rechargeable battery generally includes a housing, an end cap assembly and an electrode assembly. The end cap assembly covers the housing to provide a closed space for the electrode assembly and electrolytic solution, and the electric energy of the electrode assembly can be led out of the housing through the electrode terminal of the end cap assembly.

For the general end cap assembly, the electrode terminal is limited by the structure of the end cap, and the space occupied by the electrode terminal is large.

SUMMARY

Embodiments of the present application provide an end cap assembly, a battery cell, a battery, a battery cell manufacturing equipment and method, to improve the problem of large space occupied by an electrode terminal.

In a first aspect, the embodiments of the present application provide an end cap assembly for a battery cell, the battery cell including an electrode assembly, the end cap assembly including an end cap, an electrode terminal and a connector, the end cap is provided with an electrode lead-out hole which penetrates the end cap in a thickness direction of the end cap; the electrode terminal is configured to be electrically connected to the electrode assembly; the connector is configured to connect the end cap to fix the electrode terminal; and where the electrode terminal is disposed opposite to the electrode lead-out hole, and a projection of the electrode terminal in the thickness direction does not overlap with a projection of the end cap in the thickness direction.

In the above solution, the connector serves to connect the electrode terminal and the end cap, thereby fixing the electrode terminal and the end cap. The electrode terminal is provided opposite to the electrode lead-out hole, and the projection of the electrode terminal in the thickness direction does not overlap with the projection of the end cap in the thickness direction, that is, the electrode terminal does not cover the electrode lead-out holes on the end cap, thus a radial size of the electrode terminal is smaller, which reduces the space occupied by the electrode terminal, saves material and has better economy.

In some embodiments, the connector clamps the electrode terminal so that the electrode terminal is fixed to the connector.

In the above solution, the connector fixes the electrode terminal by clamping the electrode terminal, the structure is simple, and the electrode terminal is not easily detached from the connector under the clamping action of the connector.

In some embodiments, the connector covers an outer periphery of the electrode terminal in a circumferential direction so that the connector clamps the electrode terminal.

In the above solution, the connector is covered on the outer periphery of the electrode terminal, so that the overall structure after the connector fixes the electrode terminal is more compact.

In some embodiments, the connector includes an enclosure, a first restraint portion and a second restraint portion; and the first restraint portion and the second restraint portion both are disposed on an inner side wall of the enclosure and arranged along a circumferential direction of the enclosure, the first restraint portion and the second restraint portion are arranged at intervals in the thickness direction, the enclosure, the first restraint portion and the second restraint portion together define an accommodation space, and the electrode terminal is at least partially located in the accommodation space.

In the solution, the electrode terminal is at least partially located in the accommodation space defined by the enclosure, the first restraint portion and the second restraint portion, so that both the first restraint portion and the second restraint portion play an axial limiting role on the electrode terminal, and the enclosure can play a radial limiting role on the electrode terminal, which can effectively limit the electrode terminal from separating from the connector.

In some embodiments, the electrode terminal includes a body portion and a protrusion portion; and the body portion is configured to be electrically connected to the electrode assembly, and the protrusion portion is connected with the body portion and extends into the accommodation space along a direction perpendicular to the thickness direction.

In the above solution, the protrusion portion extends into the accommodation space in the direction perpendicular to the thickness direction of the end cap, so that the first restraint portion and the second restraint portion limit the protrusion portion of the electrode terminal, so as to limit the electrode terminal from separating from the connector in the thickness direction of the end cap.

In some embodiments, the first restraint portion is closer to the electrode assembly than the second restraint portion, the inner side wall of the second restraint portion defines an escape hole, and the body portion passes through the escape hole along the thickness direction and extends outside the connector.

In the above solution, the body portion passes through the escape hole along the thickness direction of the end cap and extends to the outside of the connector, which is convenient for connecting the electrode terminal with other members.

In some embodiments, the electrode terminal abuts against the first restraint portion and second restraint portion to restrict movement of the electrode terminal related to the connector in the thickness direction.

In the above solution, the electrode terminal abuts against the first restraint portion and the second restraint portion, so that the movement of the electrode terminal relative to the connector in the thickness direction can be effectively restricted.

In some embodiments, the connector is in sealing connection with the end cap.

In the above solution, the connector is in sealing connection with the end cap to ensure the sealing between the connector and the end cap.

In some embodiments, the connector is at least partially inserted in the electrode lead-out hole.

In the above solution, the connector is at least partially inserted in the electrode lead-out hole, so that on the one hand, the positioning of the connector can be realized; on the other hand, the space inside the electrode lead-out hole is reasonably utilized, which can effectively reduce the space outside the end cap occupied by the connector.

In some embodiments, the electrode terminal is at least partially inserted in the electrode lead-out hole.

In the above solution, the connector is at least partially inserted in the electrode lead-out hole, so that the space inside the electrode lead-out hole is reasonably utilized, and the space outside the end cap occupied by the electrode terminal can be effectively reduced.

In some embodiments, the end cap includes a first end face and a second end face arranged opposite each other in the thickness direction, the first end face being closer to the electrode assembly than the second end face; and the connector does not extend beyond the first end face along a direction in which the second end face points to the first end face.

In the above solution, the connector does not exceed the first end face of the end cap closer to the electrode assembly, and the connector does not occupy the outer space of the end cap located on the side of the first end face away from the second end face, thus vacating more space for other components in the battery unit.

In some embodiments, the connector includes a third end face and a fourth end face arranged opposite each other in the thickness direction; and the third end face is flush with the first end face, and the second end face is located between the third end face and the fourth end face in the thickness direction.

In the above solution, the third end face is flush with the first end face, so that, on the one hand, a flatness of the connector and the side the end cap close to the electrode assembly is improved, and on the other hand, the connector is inserted deeper into the electrode lead-out hole, which improves the stability of the connector after being inserted into the electrode lead-out hole. Since the second end face is located between the third end face and the fourth end face in the thickness direction, the connector includes a part beyond the second end face of the end cap, which is convenient for mounting the connector.

In some embodiments, an outer side wall of the connector is provided with an abutment portion, and the abutment portion is configured to abut against the end cap in the thickness direction.

In the above solution, the abutment portion on the outer side wall of the connector abuts against the end cap in the thickness direction of the end cap, thereby limiting the connector in the thickness direction of the end cap.

In some embodiments, the end cap is provided with an accommodation groove for accommodating the abutment portion.

In the above solution, the accommodation groove on the end cap can accommodate the abutment portion, so as to reduce the space occupied by the abutment portion outside the end cap.

In some embodiments, the abutment portion is arranged along the circumferential direction of the outer side wall of the connector, and the accommodation groove is arranged around the electrode lead-out hole.

In the above solution, the abutment portion is disposed along the circumferential direction of the outer side wall of the connector, and the accommodation groove is arranged around the electrode lead-out hole, so that the abutment portion is also arranged around the electrode lead-out hole, which improves the stability of the connector after being connected to the end cap.

In some embodiments, the end cap includes a first end face and a second end face arranged opposite each other in the thickness direction, the first end face being closer to the electrode assembly than the second end face; and the accommodation groove is provided on the first end face or the second end face.

In the above solution, the accommodation groove can be provided on the first end face of the end cap or on the second end face of the end cap. If the accommodation groove is provided on the first end face of the end cap, the abutment portion abuts against the end cap along the direction that the first end face points to the second end face; and if the accommodation groove is provided on the second end face of the end cap, the abutment portion abuts against the end cap in the direction that the second end face points to the first end face.

In some embodiments, the abutment portion includes a welding surface for welding to the end cap; and the accommodation groove is provided on the first end face, and the welding face is flush with the first end face; or, the accommodation groove is provided on the second end face, and the welding face is flush with the second end face.

In the above solution, under the condition that the accommodation groove is provided on the first end face, the welding surface of the abutment portion is flush with the first end face, and welding can be carried out at the junction position of the welding surface and the first end face, so that the abutment portion and the end cap are conveniently welded and fixed; and under the condition that the accommodation groove is provided on the second end face, the welding surface of the abutment portion is flush with the second end face, and welding can be carried out at the junction position of the welding surface and the second end face, so that the abutment portion and the end cap are conveniently welded and fixed.

In some embodiments, the end cap assembly further includes a barrier; and an accommodation gap is formed between an inner contour of the connector and an outer contour of the electrode terminal, and the barrier is at least partially disposed in the accommodation gap to block a contact between the electrode terminal and the connector.

In the above solution, the barrier located in the accommodation gap plays a role in blocking the connector and the electrode terminal, and blocking electrode terminal from being in direct contact with the connector.

In some embodiments, the barrier includes a sealing portion; and the sealing portion is at least partially located in the accommodation gap to achieve a sealing connection between the electrode terminal and the connector.

In the above solution, the sealing connection between the electrode terminal and the connector can be realized by the sealing portion in the barrier, and the electrolyte (such as electrolytic solution) in the battery cell is not easy to leak from between the connector and the end cap.

In some embodiments, the barrier includes an insulating portion; and the insulating portion is at least partially located in the accommodation gap to achieve an insulating isolation between the electrode terminal and the connector.

In the above solution, the insulating isolation between the electrode terminal and the connector can be realized by the insulating portion in the barrier.

In some embodiments, the barrier includes a conductive portion; and the conductive portion is at least partially located in the accommodation gap to achieve an electrical connection between the electrode terminal and the connector.

In the above solution, the electric connection between the electrode terminal and the connector can be realized through the conductive portion in the barrier.

In some embodiments, a portion of the connector is inserted in the electrode lead-out hole and a portion of the connector is located outside the electrode lead-out hole; and a portion of the barrier member covers a portion of the connector outside the electrode lead-out hole.

In the above solution, a portion of the barrier covers the part of the connector located outside the electrode lead-out hole, and the barrier plays a good protective role on the part of the connector exposed outside the end cap.

In some embodiments, the connector includes an enclosure and a first restraint portion; and the first restraint portion is disposed on an inner side wall of the enclosure and arranged along a circumferential direction of the enclosure, the electrode terminal is at least partially located in the enclosure, the first restraint portion and the electrode terminal form a first gap, the enclosure and the electrode terminal form a second gap connected with the first gap, the first gap and the second gap each forms a portion of the accommodation gap, a portion of the barrier is located in the first gap, and a portion of the barrier is located in the second gap.

In the above solution, a portion of the barrier is located in a first gap formed by the first restraint portion and the electrode terminal, and a portion of the barrier is located in a second gap formed by the enclosure and the electrode terminal, so as to separate the electrode terminal from the connector. The electrode terminal can abut against the first restraint portion through the part of the barrier located in the first gap, so that the first restraint portion plays an axial limiting role on the electrode terminal; and the electrode terminal can abut against the enclosure through the part of the barrier located in the second gap, so that the enclosure plays a radial limiting role on the electrode terminal.

In some embodiments, the connector further includes a second restraint portion arranged at intervals from the first restraint portion in a thickness direction of the end cap; and the second restraint portion is disposed on the inner side wall of the enclosure and arranged in the circumferential direction of the enclosure, the second restraint portion and the electrode terminal form a third gap connected with the second gap, the third gap forms a portion of the accommodation gap, and a portion of the barrier is located in the third gap.

In the above solution, a portion of the barrier is located in the third gap, and the electrode terminal can abut against the second restraint portion through the part of the barrier located in the third gap, so that the axial movement of the electrode terminal can be restricted under the limiting action of the first restraint portion and the second restraint portion.

In a second aspect, the embodiments of the present application provide a battery cell including a housing, an electrode assembly and the end cap assembly provided by any one embodiment of the first aspect, where the housing includes an opening; the electrode assembly is accommodated in the housing; the end cap is configured to cover the opening, and the electrode terminal is configured to be electrically connected with the electrode assembly.

In the third aspect, a battery provided by the embodiments of the present application includes a box body and a battery cell provided by any one embodiment of the second aspect, where the battery cell is accommodated in the box body.

In a fourth aspect, the embodiments of the present application provide an electrically-operated device including the battery cell provided by any one embodiment of the second aspect.

In a fifth aspect, the embodiments of the present application provide an manufacturing method of a battery cell, which includes: providing a housing including an opening; providing an electrode assembly; providing an end cap assembly, the end cap assembly including an end cap, an electrode terminal, and a connector, where the end cap is provided with an electrode lead-out hole which penetrates the end cap in a thickness direction of the end cap, the electrode terminal is configured to be electrically connected to the electrode assembly, the connector is configured to connect the end cap to fix the electrode terminal, where the electrode terminal is disposed opposite to the electrode lead-out hole, and a projection of the electrode terminal in the thickness direction does not overlap with a projection of the end cap in the thickness direction; and accommodating the electrode assembly in the housing; and covering the end cap on the opening, and electrically connecting the electrode terminal with the electrode assembly.

In a sixth aspect, the embodiments of the present application provide an manufacturing equipment for a battery cell, which includes a first providing apparatus, a second providing apparatus, a third providing apparatus and an assembling apparatus; the first providing apparatus for providing a housing including an opening; the second providing apparatus for providing an electrode assembly; the third providing apparatus for providing an end cap assembly, the end cap assembly including an end cap, an electrode terminal, and a connector, where the end cap is provided with an electrode lead-out hole which penetrates the end cap in a thickness direction of the end cap, the electrode terminal is configured to be electrically connected to the electrode assembly, the connector is configured to connect the end cap to fix the electrode terminal, where the electrode terminal is disposed opposite to the electrode lead-out hole, and a projection of the electrode terminal in the thickness direction does not overlap with a projection of the end cap in the thickness direction; and the assembling apparatus for accommodating the electrode assembly in the housing, and covering the end cap on the opening; and where the electrode terminal is electrically connected with the electrode assembly.

BRIEF DESCRIPTION OF THE DRAWINGS

In order to more clearly explain the technical solution of the embodiments of the present application, the drawings required for use in the embodiments of the present application will be briefly described below, and it will be apparent that the drawings described below are only some embodiments of the present application, and other drawings may be obtained from the drawings without exerting creative effort by those of ordinary skill in the art.

Figure 1:
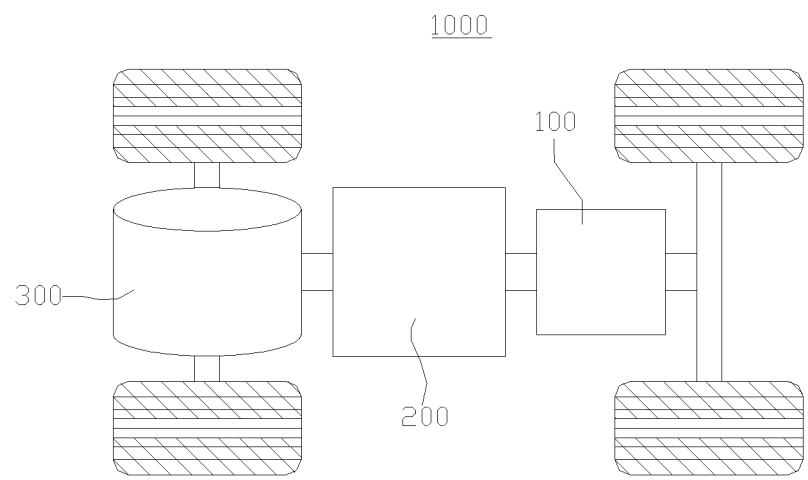
FIG. 1 is a structural schematic diagram of a vehicle provided by some embodiments of the present application.

In the drawings, the drawings are not drawn to actual scale.

Reference signs: 10—box body; 11—part I; 12—part II; 13—sealing space; 20—battery cell; 21—housing; 211—opening; 22—electrode assembly; 221—positive plate; 222—negative plate; 223—separator; 23—end cap assembly; 231—end cap; 2311—electrode lead-out hole; 2312—first end face; 2313—second end face; 2314—accommodation groove; 232—electrode terminal; 2321—body portion; 2322—protrusion portion; 2323—annular recess; 233—connector; 2331—third end face; 2332—fourth end face; 2333—abutment portion; 2333a—welding surface; 2334—enclosure; 2334a—annular protrusion; 2335—first restraint portion; 2335a—inserting hole; 2336—second restraint portion; 2336a—escape hole; 2337—accommodation space; 235—adapter piece; 2351—piece body; 2352—bump; 236—insulating member; 237—barrier; 2371—sealing portion; 2372—insulating portion; 2373—conductive portion; 238—accommodation gap; 2381—first gap; 2382—second gap; 2382a—transition gap; 2383—third gap; 24—pressure relief mechanism; 30—battery module; 31—busbar; 100—battery; 200—controller; 300—motor; 1000—vehicle; 2000—manufacturing equipment; 2100—a first providing apparatus; 2200—second providing apparatus; 2300—third providing apparatus; 2400—assembling apparatus; z—thickness direction.

DETAILED DESCRIPTION OF THE EMBODIMENTS

In order to make the object, technical solution and advantages of the embodiments of the present application clearer, the technical solution of the embodiments of the present application will be clearly described in conjunction with the accompanying drawings in the embodiments of the present application, and it will be obvious that the described embodiments are part of the embodiments of the present application, but not all of them. Based on the embodiments, in the present application, all other embodiments obtained by those of ordinary skilled in the art without exerting creative efforts fall within the scope of protection of the present application.

Unless otherwise defined, all the technical and scientific terms used herein have the same meanings as are commonly understood by those skilled in the art of the present application. Terms used herein in the description of the present application are for the purpose of describing specific embodiments only and are not intended to limit the present application. The terms "including" and "having" and any variations thereof in the description and claims as well as the drawings of the present application are intended to cover non-exclusive inclusion. The terms "first", "second", etc. in the description and claims or the above drawings of the present application or in the above drawings are used to distinguish different objects and are not used to describe a particular order or primary-secondary relationship.

The "embodiment" mentioned in the present application means that special features, structures, or characteristics described in conjunction with the embodiments may be included in at least one embodiment of the present application. The occurrence of "embodiment" in various positions in the description does not necessarily refer to the same embodiment, nor is it a separate or alternative embodiment that is mutually exclusive to other embodiments.

In the description of the present application, it should also be noted that unless otherwise expressly specified and limited, the terms "mount", "joint", "connect" and "attach"

should be understood in a broad sense, for example, it can be a fixed connection or a detachable connection, or being integrally connected; it can be being directly connected or indirectly connected through an intermediate medium, and it can be an internal communication between two components. The specific meanings of the above terms in the present application may be understood in particular to those of ordinary skill in the art.

In embodiments of the present application, like reference signs denote like components, and for the sake of brevity, detailed description of the same components is omitted in different embodiments. It should be understood that the dimensions such as thickness, length and width of various components and the overall thickness, length and width of the integrated device in the embodiments of the present application shown in the drawings are illustrative only and should not be defined in any way.

As used in this application, "multiple" refers to more than two (including two).

In the present application, the battery cell may include a lithium ion secondary battery, a lithium ion primary battery, a lithium sulfur battery, a sodium lithium ion battery, a sodium ion battery or a magnesium ion battery, etc. The embodiments of the present application are not limited thereto. The battery cells may be cylindrical, flat, cuboid or other shapes, and the embodiments of the present application are not limited thereto. The battery cells are generally divided into three types according to the packaging method: cylindrical battery cells, prismatic battery cells and pouch battery cells, the embodiments of the present application are not limited thereto.

The battery referred to in embodiments of the present application refers to a single physical module that includes one or more battery cells to provide higher voltage and capacity. For example, the battery referred to in the present application may include a battery module or a battery pack or the like. The battery generally includes a box body for encapsulating one or more battery cells. The box body can avoid liquid or other foreign matters affecting the charging or discharging of battery cells.

The battery cell includes an electrode assembly and an electrolytic solution, and the electrode assembly consists of a positive plate, a negative plate and a separator. Battery cell works mainly by the movement of metal ions between positive and negative plates. The positive plate includes a positive current collector and a positive electrode active material layer, where the positive electrode active material layer is coated on the surface of a positive current collector, the positive current collector not coated with the positive electrode active material layer protrudes from the positive current collector coated with the positive electrode active material layer, and the positive current collector not coated with the positive electrode active material layer serves as a positive tab. Taking the lithium ion battery as an example, the positive current collector material can be aluminum, and the positive active material can be lithium cobaltate, lithium iron phosphate, ternary lithium or lithium manganate etc. The negative plate includes a negative current collector and a negative electrode active material layer, where the negative electrode active material layer is coated on the surface of a negative current collector, the negative current collector not coated with the negative electrode active material layer protrudes from the negative current collector coated with the negative electrode active material layer, and the negative current collector not coated with the negative electrode active material layer serves as a negative tab. The material of the negative current collector can be copper, and the negative active material can be carbon or silicon. In order to ensure that a large current is passed without fusing, the number of positive tabs is multiple and stacked together, and the number of negative tabs is multiple and stacked together. The material of the separator can be PP (polypropylene) or PE (polyethylene), etc. Further, the electrode assembly may be a winding structure or a laminated structure, and the embodiments of the present application are not limited thereto.

The battery cell can also include a housing and an end cap assembly, the end cap assembly covers the housing to provide a closed space for the electrode assembly and the electrolytic solution, the electrode assembly is electrically connected with the electrode terminal of the end cap assembly, and the electric energy of the electrode assembly can be led out to the outside of the housing through the electrode terminal of the end cap assembly.

The inventors have discovered that, for the general end cap assembly, the electrode terminal is limited by the structure of the end cap, and the space occupied by the electrode terminal is large. It is found that in the end cap assembly, the electrode terminal needs to cover the electrode lead-out hole on the end cap, which leads to a large space occupied by the electrode terminal.

In view of this, the embodiment of this application provides a technical solution, where the electrode terminal and the end cap are connected through a connector, the electrode terminal and the electrode lead-out hole are disposed opposing each other, and a projection of the electrode terminal in the thickness direction and a projection of the end cap in the thickness direction do not overlap. This makes the radial size of the electrode terminal smaller, reduces the space occupied by the electrode terminal, saves materials, and has better economy.

The technical solution described in the embodiments of the application is applicable to batteries and an electrically-operated device using batteries.

The electrically-operated device can be vehicles, mobile phones, portable devices, notebook computers, ships, spacecraft, electric toys and electric tools, and so on. The vehicle can be a fuel vehicle, a gas vehicle or a new energy vehicle, and the new energy vehicle can be a pure electric vehicle, a hybrid vehicle or an extended-range vehicle. Spacecraft includes airplanes, rockets, space shuttles, spaceships and so on. Electric power toys include stationary or mobile power toys, for example, game machines, electric car toys, electric ship toys and electric plane toys, etc. Electric power tools include metal cutting power tools, grinding power tools, assembly power tools and railway power tools, such as electric drills, electric grinders, electric wrenches, electric screwdrivers, electric hammers, impact drills, concrete vibrators and electric planers and so on. The embodiments of the present application do not make special restrictions on the above-mentioned electrically-operated device.

The following examples are illustrated for ease of illustration, using a vehicle as the electrically-operated device.

Referring to FIG. 1, FIG. 1 is a schematic structural diagram of a vehicle 1000 provided by some embodiments of the present application. A battery 100 is disposed inside the vehicle 1000, and the battery 100 may be disposed at a bottom, head or tail of the vehicle 1000. The battery 100 may be used for power supply of the vehicle 1000, for example, the battery 100 may be used as an operating power supply of the vehicle 1000.

The vehicle 1000 may also include a controller 200 and a motor 300. The controller 200 is used to control the battery 100 to supply power to the motor 300, for example, for starting navigation and operating power requirements during driving of the vehicle 1000.

In some embodiments of the present application, the battery 100 may be used not only as an operating power source for the vehicle 1000, but also as a driving power source for the vehicle 1000, to provide driving power for the vehicle 1000 instead of or in part instead of fuel or natural gas.

Figure 2:
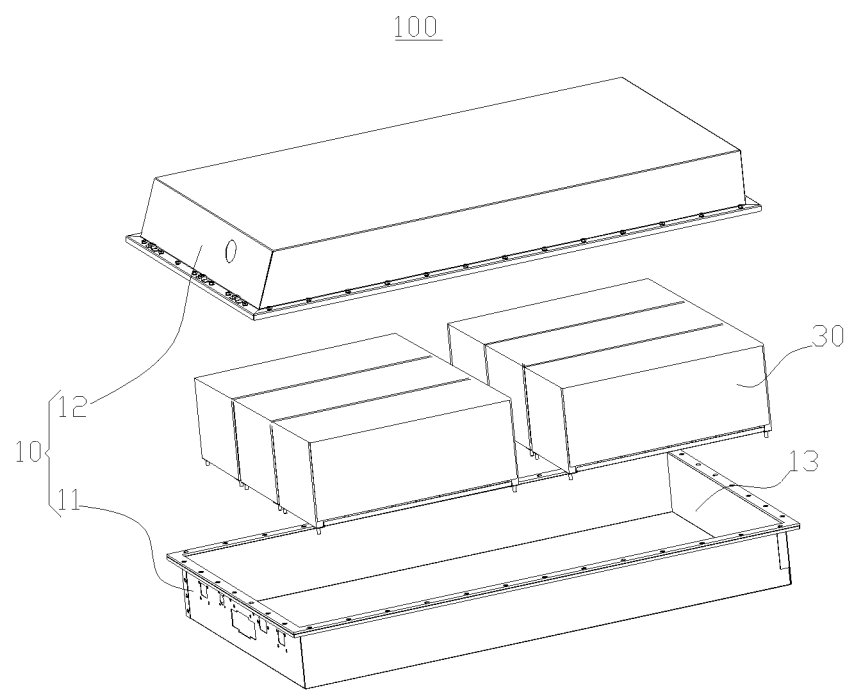
FIG. 2 is an explosion diagram of a battery provided by some embodiments of the present application.

Referring to FIG. 2, FIG. 2 is an explosion diagram of the battery 100 provided by some embodiments of the present application, the battery 100 includes a box body 10 and a battery cell 20 (not shown in FIG. 2), and the battery cell 20 is accommodated in the box body 10.

The box body 10 is used for providing a closed space for the battery cell 20 and may be of various shapes such as a cylinder, a cuboid or the like. In FIG. 2, as an example, the box body 10 is a cuboid.

In some embodiments, as shown in FIG. 2, the box body 10 may include a first part 11 and a second part 12. The first part 11 and the second part 12 cover each other to define a sealing space 13 for accommodating the battery cells 20. The first part 11 may be a hollow structure with an opening on one side, and the second part 12 may also be a hollow structure with an opening on one side. The opening side of the second part 12 covers the opening side of the first part 11, thereby forming the box body 10 including the sealing space 13.

In FIG. 2, the second part 12 is located on an upper side of the first part 11, which may also be referred to as an upper box body, and the first part 11 may also be referred to as a lower box body.

In the battery 100, the battery cells 20 may be one or plural. If there is a plurality of battery cells 20, the battery cells 20 may be connected in series or in parallel or in a mixed connection, the mixed connection means that the battery cells 20 are both connected in series and in parallel. The plurality of battery cells 20 can be directly connected in series, in parallel or in a mixed connection, and the whole body formed by the plurality of battery cells 20 is accommodated in the box body 10. Certainly, a plurality of battery cells 20 may first be connected in series, in parallel or in a mixed connection to form a battery module 30, and the plurality of battery modules 30 may be connected in series, in parallel or in a mixed connection to form a whole body and be accommodated in the box body 10. The battery cell 20 may be cylindrical, flat, rectangular, or other shapes.

Figure 3:
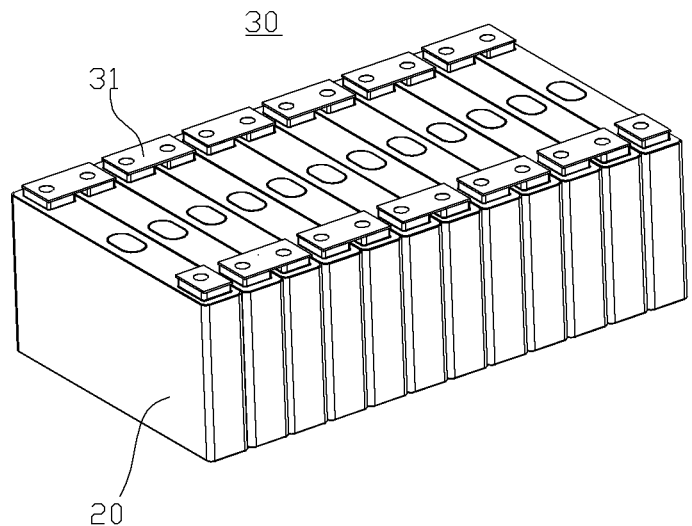
FIG. 3 is a schematic structural diagram of a battery module shown in FIG. 2.

In some embodiments, please refer to FIG. 3, FIG. 3 is a schematic structural diagram of the battery module 30 shown in FIG. 2. The battery cells 20 are plural, and the battery modules 20 are first connected in series or in parallel or in a mixed connection to form the battery module 30, and the plurality of battery modules 30 are connected in series or in parallel or in a mixed connection to form a whole body and accommodated in the box body 10.

In some embodiments, the battery 100 may also include a busbar 31 through which electrical connection between the plurality of battery cells 20 may be effected, to achieve series or parallel or mixed connection of the plurality of battery cells 20. Taking the series connection of two battery cells 20 as an example, a positive electrode terminal of one battery cell 20 and a negative electrode terminal of the other battery cell 20 are connected through the busbar 31 to realize the series connection of the two battery cells 20.

Figure 4:
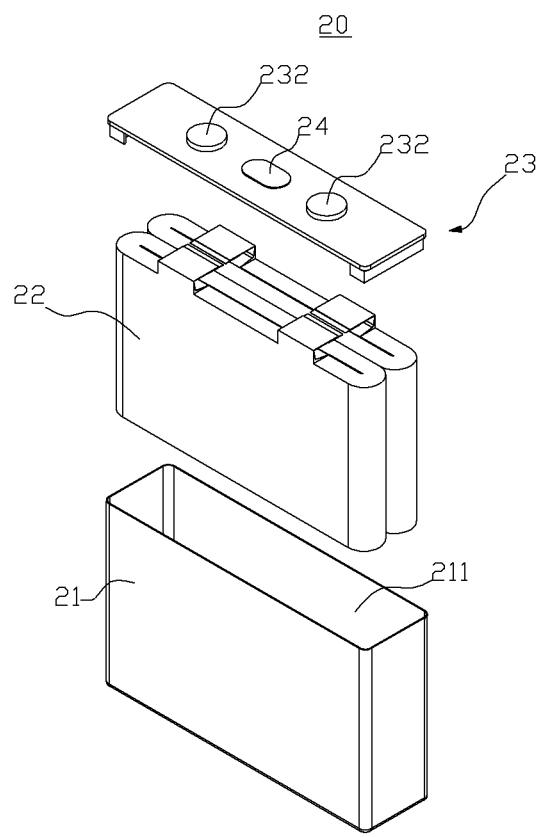
FIG. 4 is an explosion diagram of a battery cell provided by some embodiments of the present application.

Please refer to FIG. 4, FIG. 4 is an explosion diagram of the battery cell 20 provided by some embodiments of the present application. The battery cell 20 may include a housing 21 including an opening 211, an electrode assembly 22 accommodated in the housing 21, and an end cap assembly 23 including an end cap 231 for covering the opening 211 and an electrode terminal 232 being configured to be electrically connected to the electrode assembly 22.

The housing 21 may be made of a variety of materials such as copper, iron, aluminum, stainless steel, aluminum alloy, and the like, and the embodiments of the present application are not particularly limited thereto.

The housing 21 may be of various shapes such as a cylinder, a cuboid or the like. The shape of the housing 21 may be determined according to the specific shape of the electrode assembly 22. For example, if the electrode assembly 22 is a cylindrical structure, the housing 21 can be selected as a cylindrical structure; if the electrode assembly 22 is a cuboid structure, the housing 21 may chose a cuboid structure. In FIG. 4, as an example, both the housing 21 and the electrode assembly 22 are of a cuboid structure.

Figure 5:
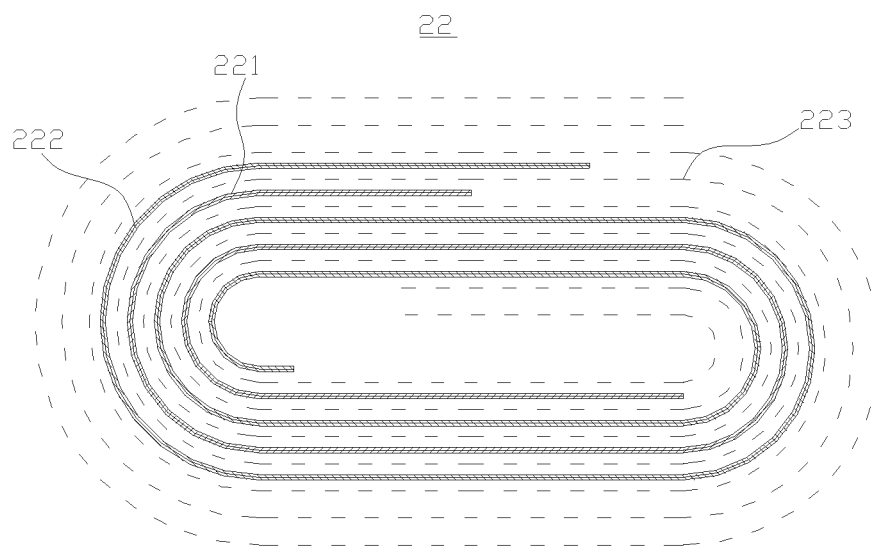
FIG. 5 is a schematic structural diagram of an electrode assembly provided by some embodiments of the present application.

The electrode assembly 22 may include a positive plate 221, a negative plate 222 and a separator 223. In some embodiments, please refer to FIG. 5, FIG. 5 is a schematic structural diagram of the electrode assembly 22 provided in some embodiments of the present application. The electrode assembly 22 may be a winding structure formed by winding the positive plate 221, the separator 223, and the negative plate 222. In other embodiments, the electrode assembly 22 may also be a laminated structure formed by a laminated arrangement of the positive plate 221 the separator 223 and the negative plate 222.

In some embodiments, the electrode assembly 22 may also include a positive tab (not shown) and a negative tab (not shown), it is possible to use a positive current collector not coated with a positive electrode active material layer in the positive plate 221 as the positive tab, and use a negative current collector not coated with a negative electrode active material layer in the negative plate 222 as the negative tab.

In the embodiment of the present application, the end cap 231 of the end cap assembly 23 is used for covering the opening 211 of the housing 21 to form a closed space (not shown) for accommodating the battery cell 20. The sealing space is also used for accommodating electrolytes, such as electrolytic solution. The electrode terminal 232 of the end cap assembly 23 serves as a part for outputting the electric energy of the electrode assembly 22, and the electrode terminal 232 is configured to be electrically connected to the electrode assembly 22, that is, the electrode terminal 232 is electrically connected with the electrode tab of the electrode assembly 22, for example, the electrode terminal 232 is connected with the electrode tab through an adapter piece 235 (refer to FIG. 6), to realize the electrical connection between the electrode terminal 232 and the electrode tab.

It should be noted that the openings 211 of the housing 21 may be one or two.

In some embodiments, as shown in FIG. 4, the opening 211 of the housing 21 may be one, and the end cap assembly 23 may also be one, in which two electrode terminals 232 may be provided, the two electrode terminals 232 being positive electrode terminals and negative electrode terminals, respectively, and the positive electrode terminals and negative electrode terminals are respectively configured to be electrically connected to the positive electrode tabs and negative electrode tabs of the electrode assembly 22. The battery cell 20 including such a structure may be a square battery cell 20.

In other embodiments, the openings 211 of the housing 21 are two, for example, two openings 211 are provided on opposite sides of the housing 21, and the end cap assemblies 23 may also be two, and the two end cap assemblies 23 respectively cover the two openings 211 of the housing 21. In this case, the electrode terminal 232 in one end cap assembly 23 is a positive electrode terminal for electrical connection with the positive tab of the electrode assembly 22; and the electrode terminal 232 in the other end cap assembly 23 is a negative electrode terminal for electrical connection with the negative plate 222 of the electrode assembly 22. The battery cell 20 including such a structure may be a cylindrical battery cell 20.

In some embodiments, the battery cell 20 may also include a pressure relief mechanism 24 mounted on the end cap 231 for relieving pressure inside the battery cell 20 when the internal pressure or temperature of the battery cell 20 reaches a predetermined value.

As an example, the pressure relief mechanism 24 may be an explosion-proof valve, a rupture plate, an air valve, a pressure relief valve or a relief valve or the like.

The specific structure of the end cap assembly 23 will be described in detail below with reference to the accompanying drawings.

Figure 6:
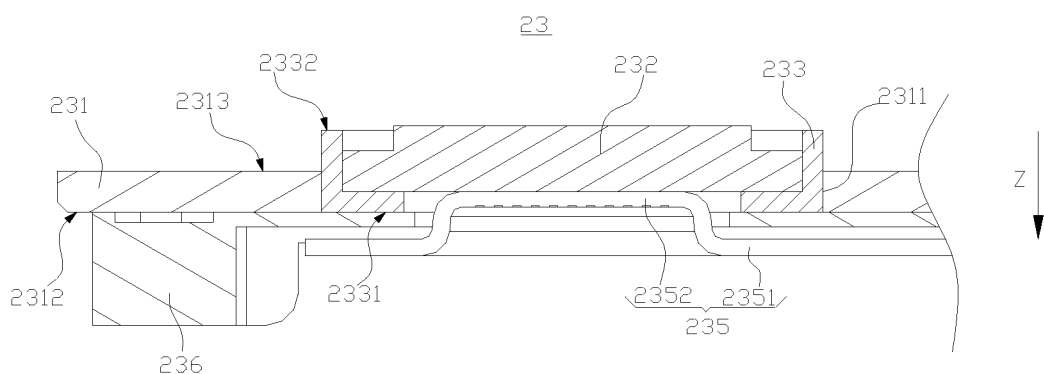
FIG. 6 is a schematic structural diagram of an end cap assembly provided by some embodiments of the present application.
Figure 7:
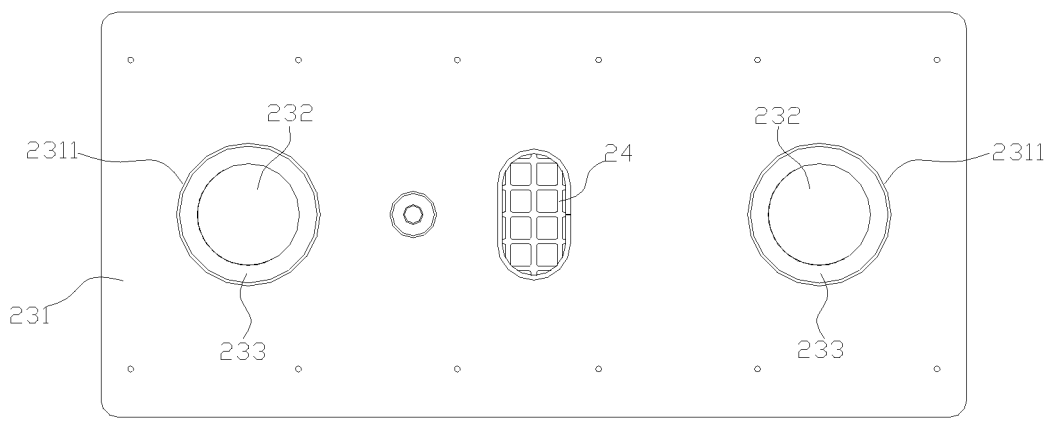
FIG. 7 is a top view of the end cap assembly shown in FIG. 6.

Referring to FIG. 6 and FIG. 7, FIG. 6 is a schematic structural diagram of the end cap assembly 23 provided by some embodiments of the present application, and FIG. 7 is a top view of the end cap assembly 23 shown in FIG. 6. The end cap assembly 23 includes an end cap 231, an electrode terminal 232, and a connector 233. The end cap 231 is provided with an electrode lead-out hole 2311 which penetrates the end cap 231 in a thickness direction Z of the end cap 231. The electrode terminal 232 is used for electrical connection with the electrode assembly 22 (see FIG. 4). The connector 233 is used to connect the end cap 231 to fix the electrode terminal 232. The electrode terminal 232 is provided opposite to the electrode lead-out hole 2311, and a projection of the electrode terminal 232 in the thickness direction Z of the end cap 231 does not overlap with a projection of the end cap 231 in the thickness direction Z.

Since the electrode terminal 232 is disposed opposite the electrode lead-out hole 2311, and the projection of the electrode terminal 232 in the thickness direction Z of the end cap 231 does not overlap with the projection of the end cap 231 in the thickness direction Z, that is, the electrode terminal 232 does not cover the electrode lead-out hole 2311 in the end cap 231, so that a radial dimension of the electrode terminal 232 (a direction perpendicular to the thickness direction Z of the end cap 231) is smaller, the space occupied by the electrode terminal 232 is reduced, the material is saved, and the economy is better.

It should be noted that a radial direction of the electrode terminal 232 does not limit the electrode terminal 232 to a cylindrical shape, and the electrode terminal 232 may include other shapes, for example, the electrode terminal 232 is a polygonal column shape. The electrode terminal 232 is disposed opposite to the electrode lead-out hole 2311, that is, the electrode terminal 232 and the electrode lead-out hole 2311 are substantially aligned in the thickness direction Z of the end cap 231, and the electrode terminal 232 and the electrode lead-out hole 2311 may be disposed coaxially or the axis of the electrode terminal 232 may be disposed parallel to the axis of the electrode lead-out hole 2311. Since the electrode terminal 232 is disposed opposite to the electrode lead-out hole 2311 and the projection of the electrode terminal 232 in the thickness direction Z of the end cap 231 does not overlap with the projection of the end cap 231 in the thickness direction Z, if the electrode terminal 232 is moved in the thickness direction Z of the end cap 231, the electrode terminal 232 passes through the electrode lead-out hole 2311 without interference with the end cap 231.

In the end cap assembly 23, the electrode terminals 232 may be one or two. If there is one electrode terminal 232 in the end cap assembly 23, there may also be one electrode lead-out hole 2311 in the end cap 231. In the battery cell 20, two end cap assemblies 23 may be disposed, the electrode terminal 232 of one end cap assembly 23 is a positive electrode terminal, and the electrode terminal 232 of another end cap assembly 23 is a negative electrode terminal. If there are two end cap assemblies 23, the electrode lead-out holes 2311 in the end cap 231 may also be provided as two. In the battery cell 20, one end cap assembly 23 may be provided, one electrode terminal 232 in the end cap assembly 23 is a positive electrode terminal, and the other electrode terminal 232 in the end cap assembly 23 is a negative electrode terminal. In FIG. 7, a case where there are two electrode terminals 232 in the end cap assembly 23 is exemplarily shown.

In some embodiments, with continued reference to FIG. 6, the end cap assembly 23 may also include an adapter piece 235 through which the electrode terminal 232 is electrically connected to the electrode assembly 22 (see FIG. 4).

The adapter piece 235 may be a metal conductor such as copper, iron, aluminum, or the like.

As an example, the adapter piece 235 includes a piece body 2351 and a bump 2352, the piece body 2351 is located on the side of the end cap 231 near the electrode assembly 22, and is configured to connect with the electrode tab of the electrode assembly 22. The bump 2352 is connected to the piece body 2351 and protrudes from the piece body 2351 to the side near the end cap 231. The bump 2352 can extend into the electrode lead-out hole 2311 and be connected with the electrode terminal 232 to realize the electrical connection between the electrode terminal 232 and the electrode assembly 22.

In some embodiments, the end cap assembly 23 may also include an insulating member 236 for achieving insulating isolation of the end cap 231 from the adapter 235.

As an example, in the thickness direction Z of the end cap 231 the insulating member 236 is at least partially located between the piece body 2351 of the adapter piece 235 and the end cap 231 to achieve insulating isolation of the end cap 231 and the adapter piece 235.

The insulating member 236 serves as an insulating function between the end cap 231 and the adapter piece 235. The insulating member 236 is made of an insulating material, which may be made of a material such as rubber or plastic, and the plastic may be PBT (Polybutylene terephthalate), PET (Polyethylene terephthalate), PA (Polyamide) or the like.

In the end cap assembly 23, an end cap 231 is used to cover an opening 211 of the housing 21 (see FIG. 4). The end cap 231 may be a plate-like structure that can be circular, rectangular, or the like. The shape of the end cap 231 may be determined according to the shape of the housing 21. For example, the housing 21 is a cuboid, and the end cap 231 can be a rectangular end cap; for another example, the housing 21 is a cylinder, and the end cap 231 may be a circular end cap.

The end cap 231 includes an opposite first end face 2312 and a second end face 2313 in its thickness direction Z, the first end face 2312 being closer to the electrode assembly 22 than the second end face 2313 (see FIG. 4), and the electrode lead-out hole 2311 penetrating through the first end face 2312 and the second end face 2313.

The electrode lead-out hole 2311 in the end cap 231 may be an equal diameter hole, that is, the radius of the electrode lead-out hole 2311 does not change in the thickness direction Z of the end cap 231. The electrode lead-out hole 2311 in the end cap 231 may also be a variable diameter hole, such as a stepped hole. Certainly, the electrode terminal 232 may be an equal diameter cylindrical structure or a variable diameter structure, such as a stepped shaft. A maximum diameter of the electrode lead-out hole 2311 is not smaller than a maximum diameter of the electrode terminal 232, so that a projection of the electrode terminal 232 in the thickness direction Z of the end cap 231 does not overlap with a projection of the end cap 231 in the thickness direction Z.

In the embodiment of the present application, the connector 233 serves to connect the electrode terminal 232 and the end cap 231, so as to fix the electrode terminal 232 and the end cap 231. The connector 233 and the end cap 231 may be connected by a variety of connections and the electrode terminal 232 and the connector 233 may also be connected by a variety of connections. Hereinafter a specific structure in which the connector 233 is connected with the end cap 231 and a specific structure in which the electrode terminal 232 is connected with the connector 233 will be described in detail.

First, the concrete structure that the connector 233 is connected with the end cap 231 is described in detail.

In some embodiments, the connector 233 is in sealing connection with the end cap 231, to ensure sealing between the connector 233 and the end cap 231, and electrolyte (e.g. electrolytic solution) in the battery cell 20 is not easily leaked from the connecting position of the connector 233 and the end cap 231.

The sealing connection between the connector 233 and the end cap 231 can be achieved in a variety of ways. For example, the sealing connection between the connector 233 and the end cap 231 is realized by a tight fit between the connector 233 and the end cap 231, and the sealing connection between the connector 233 and the end cap 231 is realized by providing a sealing member between the connector 233 and the end cap 231, and the sealing connection between the connector 233 and the end cap 231 is realized by welding the connector 233 and the end cap 231 together.

In some embodiments, the connector 233 is at least partially inserted in the electrode lead-out hole 2311. On the one hand, this structure can realize the positioning of the connector 233. On the other hand, by reasonably utilizing the space inside the electrode lead-out hole 2311, the space outside the end cap 231 occupied by the connector 233 can be effectively reduced.

In the present embodiments, the sealing connection between the connector 233 and the end cap 231 can be achieved in a variety of ways. For example, an outer side wall of the connector 233 and a hole wall of the electrode lead-out hole 2311 are closely fitted to achieve the sealing connection between the connector 233 and the end cap 231. For another example, a sealing ring is provided between the hole wall of the electrode lead-out hole 2311 and the outer side wall of the connector 233 to achieve the sealing connection between the connector 233 and the end cap 231. For yet another example, the connector 233 and the end cap 231 are connected together by welding, so that solder is sealed in a gap between the outer wall of the connector 233 and the hole wall of the electrode lead-out hole 2311, thereby achieving the sealing connection between the connector 233 and the end cap 231.

In some embodiments, the connector 233 does not extend beyond the first end face 2312 of the end cap 231 in a direction in which the second end face 2313 of the end cap 231 points to the first end face 2312. This structure allows the connector 233 not to occupy the outer space of the end cap 231 located on the side of the first end face 2312 away from the second end face 2313, thereby freeing up more space for other components (such as the insulating member 236) in the battery cell 20, to provide more space for the electrode assembly 22 to improve the energy density of the battery cell 20.

Alternatively, the connector 233 includes a third end face 2331 and a fourth end face 2332 disposed opposite each other in the thickness direction Z of the end cap 231, the third end face 2331 is closer to the electrode assembly 22 than the fourth end face 2332. The third end face 2331 is flush with the first end face 2312, and the second end face 2313 is located between the third end face 2331 and the fourth end face 2332 in the thickness direction Z of the end cap 231.

Since the third end face 2331 is flush with the first end face 2312, on the one hand, the flatness of the side of the connector 233 and the end cap 231 close to the electrode assembly 22 is improved, and on the other hand, the connector 233 is inserted deeper into the electrode lead-out hole 2311, thus improving the stability of the connector 233 after being inserted into the electrode lead-out hole 2311. Since the second end face 2313 is located between the third end face 2331 and the fourth end face 2332 in the thickness direction Z of the end cap 231, the connector 233 includes a portion beyond the second end face 2313 of the end cap 231, thereby facilitating installation of the connector 233.

It should be noted that the third end face 2331 is flush with the first end face 2312, and is not limited to the fact that the first end face 2312 is absolutely flush with the second end face 2313, a small distance between the third end face 2331 and the first end face 2312 within an error range is allowable.

The second end face 2313 is located between the third end face 2331 and the fourth end face 2332 in the thickness direction Z of the end cap 231, that is, a portion of the connector 233 is inserted in the electrode lead-out hole 2311. In other embodiments, the fourth end face 2332 may be located between the first end face 2312 and the second end face 2313 such that the connector 233 is fully inserted in the electrode lead-out hole 2311.

Figure 8:
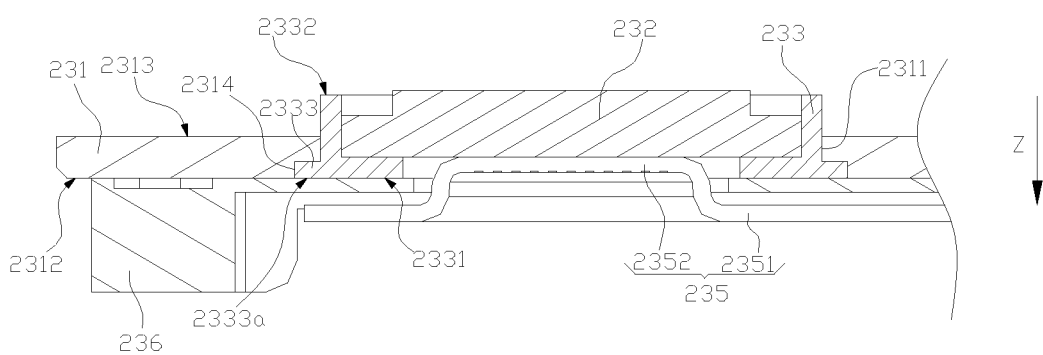
FIG. 8 is a schematic structural diagram of an end cap assembly provided by some other embodiments of the present application.
Figure 9:
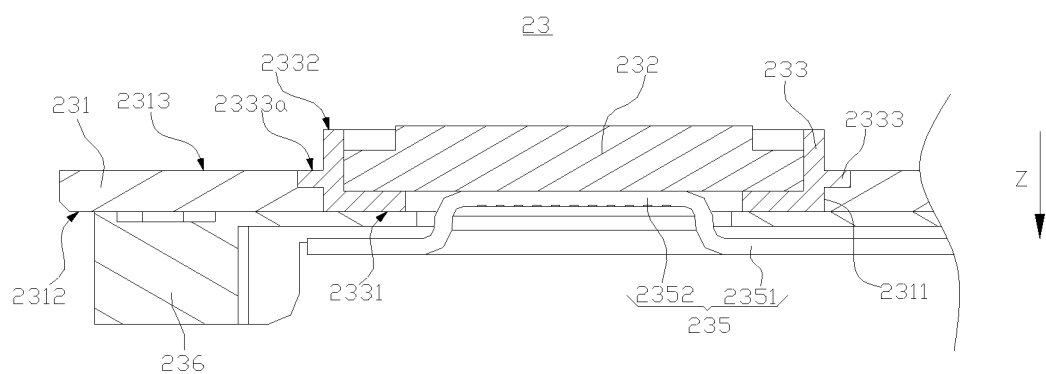
FIG. 9 is a schematic structural diagram of an end cap assembly provided by some still other embodiments of the present application.

In some embodiments, please refer to FIGS. 8 and 9, FIG. 8 is a schematic structural diagram of the end cap assembly 23 provided by some other embodiments of the present application, and FIG. 9 is a schematic structural diagram of the end cap assembly 23 provided by some still other embodiments of the present application. The outer side wall of the connector 233 is provided with an abutment portion 2333, and the abutment portion 2333 is configured to abut against the end cap 231 in the thickness direction Z of the end cap 231.

When the abutment portion 2333 abuts against the end cap 231 in the thickness direction Z of the end cap 231 during the process of inserting the connector 233 into the electrode lead-out hole 2311, the connector 233 cannot be further inserted into the electrode lead-out hole 2311 to limit the position of the connector 233 in the thickness direction Z of the end cap 231.

The abutment portion 2333 and the end cap 231 include e various abutment forms, for example, the abutment portion 2333 directly abuts against the first end face 2312 of the end cap 231; for an another example, the abutment portion 2333 directly abuts against the second end face 2313 of the end cap 231.

Certainly, the abutment portion 2333 and the end cap 231 may include other abutment forms. In some embodiments, the end cap 231 is provided with an accommodation groove 2314 for accommodating the abutment portion 2333. That is, the end cap 231 abuts against the groove bottom wall of the accommodation groove 2314. The accommodation groove 2314 on the end cap 231 is provided so that the space outside the end cap 231 occupied by the abutment portion 2333 is reduced.

The abutment portion 2333 may be disposed in the circumferential direction of the outer side wall of the connector 233 and the accommodation groove 2314 may be disposed around the electrode lead-out hole 2311. As an example, both the abutment portion 2333 and the accommodation groove 2314 are an annular structure.

In some embodiments, as shown in FIG. 8, the accommodation groove 2314 may be provided at the first end face 2312 of the end cap 231. In other embodiments, as shown in FIG. 9, the accommodation groove 2314 may also be provided on the second end face 2313. If the accommodation groove 2314 is provided at the first end face 2312 of the end cap 231, the abutment portion 2333 abuts against the end cap 231 in a direction in which the first end face 2312 points to the second end face 2313. If the accommodation groove 2314 is provided at the second end face 2313 of the end cap 231, the abutment portion 2333 abuts against the end cap 231 in a direction in which the second end face 2313 points to the first end face 2312.

In some embodiments, the abutment portion 2333 is welded to the end cap 231 to fix the connector 233 to the end cap 231.

As an example, the abutment portion 2333 includes a welding surface 2333a for welding with the end cap 231. As shown in FIG. 8, if the accommodation groove 2314 is provided on the first end face 2312, the welding surface 2333a of the abutment portion 2333 can be flush with the first end face 2312. In this case, welding can be performed at a junction of the welding surface 2333a and the first end face 2312 to facilitate welding and fixing the abutment portion 2333 and the end cap 231. As shown in FIG. 9, if the accommodation groove 2314 is provided on the second end face 2313, the welding surface 2333a can be flush with the second end face 2313. In this case, welding can be performed at a junction of the welding surface 2333a and the second end face 2313, so as to facilitate welding and fixing the abutment portion 2333 and the end cap 231.

It should be noted that the welding surface 2333a is flush with the first end face 2312, and is not limited to the fact that the welding surface 2333a is absolutely flush (coplanar) with the first end face 2312, a small distance between the welding surface 2333a and the first end face 2312 within an error range is allowable. Similarly, the welding face 2333a is flush with the second end face 2313, and is not limited to being absolutely flush (coplanar) with the second end face 2313, a small distance between the welding face 2333a and the second end face 2313 within an error range is allowable.

When the abutment portion 2333 is arranged in the circumferential direction of the outer side wall of the connector 233, and the accommodation groove 2314 is arranged around the electrode lead-out hole 2311, the entire circumference of the welding surface 2333a can be welded to achieve the sealing connection between the connector 233 and the end cap 231.

Figure 10:
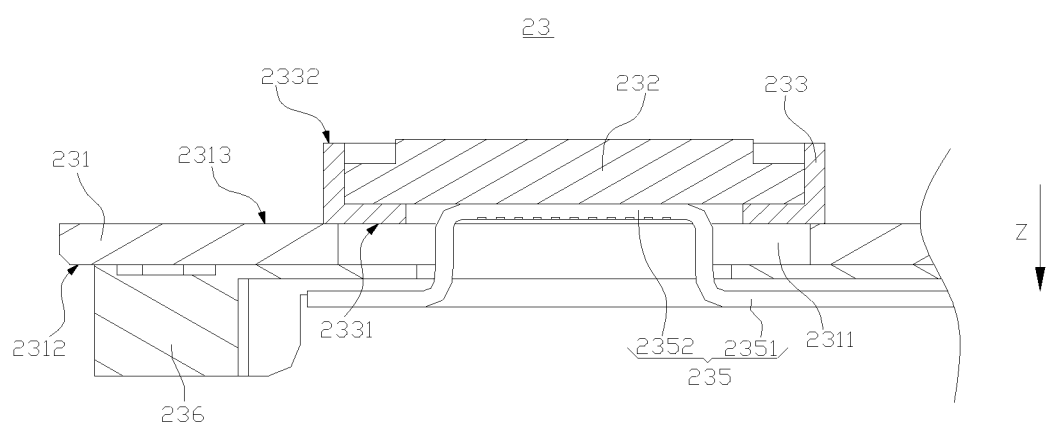
FIG. 10 is a schematic structural diagram of an electrode assembly provided by another embodiments of the present application.

As can be seen from the above embodiments, the connection between the connector 233 and the end cap 231 can be realized by at least partially inserting the connector 233 into the electrode lead-out hole 2311. In other embodiments, please refer to FIG. 10, FIG. 10 is a schematic structural diagram of the electrode assembly 22 provided in other embodiments of the present application. The connector 233 may not be inserted in the electrode lead-out hole 2311, for example, the connector 233 is located on the side of the end cap 231 away from the electrode assembly 22, and the third end face 2331 of the connector 233 is in contact with the second end face 2313 of the end cap 231 and welded together.

In some embodiments, as shown in FIGS. 6, 8 and 9, after the electrode terminal 232 and the end cap 231 are together through the connector 233, the electrode terminal 232 can be at least partially inserted in the electrode lead-out hole 2311, and the space inside the electrode lead-out hole 2311 is reasonably utilized, which can effectively reduce the space outside the end cap 231 occupied by the electrode terminal 232. Certainly, as shown in FIG. 10, the electrode terminal 232 may be located completely outside the electrode lead-out hole 2311.

Next, the specific structure in which the electrode terminal 232 is connected with the connector 233 is described in detail.

In some embodiments, the connector 233 is clamped to the electrode terminal 232 such that the electrode terminal 232 is fixed to the connector 233.

The connector 233 realizes the fixation of the electrode terminal 232 by clamping the electrode terminal 232 with a simple structure, and the electrode terminal 232 is not easily detached from the connection member 233 under the clamping action of the connector 233.

The connector 233 may be of a variety of structures for clamping and fixing the electrode terminal 232. The connector 233 may clamp the electrode terminal 232 in a radial direction (a direction perpendicular to the thickness direction Z of the end cap 231) or in an axial direction (the thickness direction Z of the end cap 231).

Figure 11:
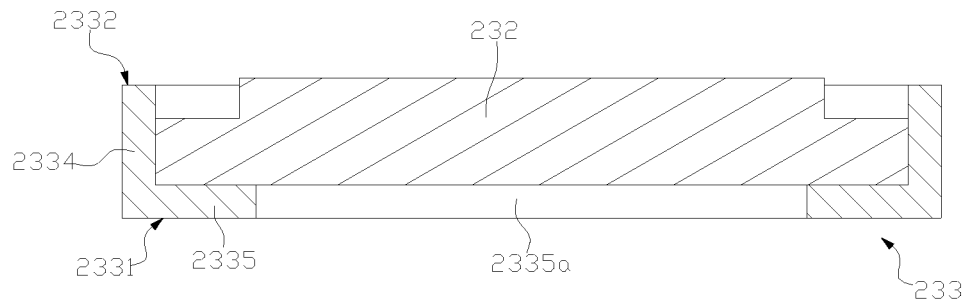
FIG. 11 is a schematic diagram of a connection (direct connection) between the electrode terminal and a connector provided by some embodiments of the present application.
Figure 12:
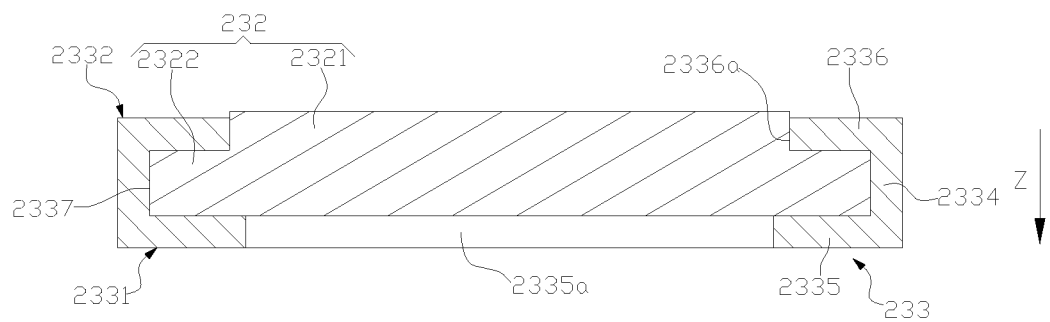
FIG. 12 is a schematic diagram of a connection (direct connection) between the electrode terminal and the connector provided by some other embodiments of the present application.

In some embodiments, referring to FIGS. 11 and 12, FIG. 11 is a schematic diagram of the connection (direct connection) between the electrode terminal 232 and the connector 233 provided by some embodiments of the present application, and FIG. 12 is a schematic diagram of the connection (direct connection) between the electrode terminal 232 and the connector 233 provided by some other embodiments of the present application. The connector 233 covers the outer circumference of the electrode terminal 232 in a circumferential direction so that the connector 233 is clamped on the electrode terminal 232. This structure makes the overall structure of the connector 233 after fixing the electrode terminal 232 more compact. It should be noted that the connector 233 covers the outer circumference of the electrode terminal 232 in a circumferential direction, and the circumferential direction here is a clockwise direction or a counterclockwise direction in a plane perpendicular to the thickness direction Z of the end cap 231. The "cover" here can be either a full circumferential covering or a non-full circumferential covering. If the connector 233 covers the full the outer circumference of the electrode terminal 232 in a circumferential direction, the connector 233 may be an integral ring structure; and if the connector 233 does not cover the full outer circumference of the electrode terminal 232, the connector 233 may be a "C" shaped structure with a central angle greater than 180 degrees. As an example, in FIGS. 11 and 12, the connector 233 covers the full outer circumference of the electrode terminal 232 in a circumferential direction.

In a case where the connector 233 is at least partially inserted in the electrode lead-out hole 2311, the connector 233 covers the outer circumference of the electrode terminal 232 in a circumferential direction such that the outer side wall of the electrode terminal 232 is spaced from the hole wall of the electrode lead-out hole 2311, so that a radial dimension of the electrode terminal 232 is smaller than a radial dimension of the electrode lead-out hole 2311, and the projection of the electrode terminal 232 in the thickness direction Z of the end cap 231 does not overlap with the projection of the end cap 231 in the thickness direction Z.

In the process of inserting the connector 233 into the electrode lead-out hole 2311, the connector 233 is inserted into the electrode lead-out hole 2311 to a certain depth so that the electrode terminal 232 is at least partially inserted into the electrode lead-out hole 2311.

In some embodiments, please refer to FIG. 11, FIG. 11 is a schematic diagram of the connection of the electrode terminal 232 and the connector 233 shown in FIG. 6. The connector 233 includes an enclosure 2334 and a first restraint portion 2335, the first restraint portion 2335 is provided on an inner side wall of the enclosure 2334 and arranged in a circumferential direction of the enclosure 2334, and the electrode terminal 232 is at least partially located in the enclosure 2334, the first restraint portion 2335 is used for limiting the electrode terminal 232 to separate from the connector 233 in a direction close to the electrode assembly 22.

The enclosure 2334 covers the outer periphery of the connector 233, and the enclosure 2334 can limit the electrode terminal 232 in a radial direction. As an example, the outer side wall of the electrode terminal 232 abuts the inner side wall of the enclosure 2334, so that the connector 233 can clamp the electrode terminal 232 in a radial direction (a direction perpendicular to the thickness direction Z of the end cap 231), that is, the clamping force applied by the enclosure 2334 of the connector 233 to the electrode terminal 232 is in the radial direction (a direction perpendicular to the thickness direction Z of the end cap 231) of the electrode terminal 232. The abutting referred to here can be direct abutting or indirect abutting. As an example, in FIG. 11, the outer side wall of the electrode terminal 232 directly abuts the inner side wall of the enclosure 2334.

When the outer side wall of the electrode terminal 232 directly abuts the inner side wall of the enclosure 2334, the connector 233 may be an insulating member such as rubber or plastic, or a conductive member such as copper, iron, aluminum or a plastic part having a conductive function. To achieve insulation between the electrode terminal 232 and the end cap 231, the connector 233 may be an insulating member. To achieve the electrical connection between the electrode terminal 232 and the end cap 231, the connector 233 may be a conductive metal. For example, the end cap assembly 23 includes two electrode terminals 232 (positive electrode terminal and negative electrode terminal), the connector 233 connected to one electrode terminal 232 may be an insulating member, the connector 233 connected to the other electrode terminal 232 may be a conductive member, and certainly, the two connectors 233 connected to the two electrode terminals 232 may both be insulating members.

As an example, the enclosure 2334 is a cylindrical structure with both ends open, and the first restraint portion 2335 is an annular structure provided on the inner side wall of the enclosure 2334.

An inner side wall of the first restraint portion 2335 defines an escape hole 2335a through which a bump 2352 of the adapter piece 235 (see FIG. 6) can enter into the connector 233 to be connected with the electrode terminal 232.

It should be noted that as shown in FIG. 6, when the connector 233 is at least partially inserted in the electrode lead-out hole 2311, the outer diameter of the enclosure 2334 and the aperture of the electrode lead-out hole 2311 can be matched so that the enclosure 2334 can be inserted in the electrode lead-out hole 2311. As shown in FIG. 10, the outer diameter of the enclosure 2334 is larger than an inner diameter of the electrode lead-out hole 2311 when the connector 233 is not inserted in the electrode lead-out hole 2311. In some embodiments, as shown in FIG. 12, the connector 233 may also include a second restraint portion 2336, the second restraint portion 2336 is provided on the inner side wall of the enclosure 2334 and arranged in the circumferential direction of the enclosure 2334, the second restraint portion 2336 and the first restraint portion 2335 are disposed at intervals in the thickness direction Z of the end cap 231. The first restraint portion 2335 is closer to the electrode assembly 22 than the second restraint portion 2336. The enclosure 2334, the first restraint portion 2335, and the second restraint portion 2336 together define an accommodation space 2337, and the electrode terminal 232 is at least partially located in the accommodation space 2337. Each of the first restraint portions 2335 and the second restraint portions 2336 can limit the electrode terminal 232 in the axial direction (the thickness direction Z of the end cap 231). The second restraint portion 2336 is used for restricting the electrode terminal 232 from separating from the connector 233 in a direction away from the electrode assembly 22.

As an example, the electrode terminal 232 abuts against the first restraint portion 2335, and the electrode terminal 232 abuts the second restraint portion 2336, to realize the clamping of the connector 233 to the electrode terminal 232 in the axial direction (the thickness direction Z of the end cap 231), i.e., the clamping force applied by the first restraint portion 2335 and the second restraint portion 2336 of the connector 233 to the electrode terminal 232 is in the axial direction (the thickness direction Z of the end cap 231) of the electrode terminal 232 to restrict movement of the electrode terminal 232 relative to the connector 233 in the thickness direction Z of the end cap 231. The abutting referred to here can be direct abutting or indirect abutting. In FIG. 12, for example, the electrode terminal 232 directly abuts the first restraint portion 2335 and the electrode terminal 232 also directly abuts the second restraint portion 2336.

It should be noted that, when the electrode terminal 232 abuts the first restraint portion 2335 and the electrode terminal 232 abuts the second restraint portion 2336, that is, when the first restraint portion 2335 and the second restraint portion 2336 clamp the electrode terminal 232, the inner side wall of the enclosure 2334 of the connector 233 and the outer side wall of the electrode terminal 232 may not abut, that is, the enclosure 2334 does not clamp the electrode terminal 232 in the radial direction (the direction perpendicular to the thickness direction Z of the end cap 231).

As an example, the second restraint portion 2336 may be an annular structure provided on the inner side wall of the enclosure 2334, and the accommodation space 2337 is an annular space.

In some embodiments, with continued reference to FIG. 12, the electrode terminal 232 includes a body portion 2321 and a protrusion 2322, the protrusion 2322 is connected to the body portion 2321 and extends along a direction perpendicular to the thickness direction Z of the end cap 231 into the accommodation space 2337.

The body portion 2321 is configured to be electrically connected the electrode assembly 22. The piece body 2351 of the adapter piece 235 (see FIG. 6) is connected to the electrode assembly 22, and the bump 2352 of the adapter piece 235 is connected to the body portion 2321, so that the body portion 2321 and the electrode assembly 22 can be electrically connected.

As an example, the body portion 2321 is a cylindrical structure and the protruding portion 2322 is an annular structure provided on the outer side wall of the body portion 2321.

In some embodiments, the inner side wall of the second restraint portion 2336 defines an escape hole 2336a, and the body portion 2321 passes through the escape hole 2336a in the thickness direction Z of the end cap 231 and extends outside the connector 233, so as to facilitate connection of the electrode terminal 232 with other members (such as a busbar).

In other embodiments, in the case where the connector 233 covers the outer circumference of the electrode terminal 232 in the circumferential direction, the connector 233 may also be of other structures, for example, the connector 233 includes only the enclosure 2334, and the outer side wall of the electrode terminal 232 abuts the inner side wall of the enclosure 2334, so that the connector 233 can be clamped in a radial direction (a direction perpendicular to the thickness direction Z of the end cap 231) against the electrode terminal 232.

Figure 13:
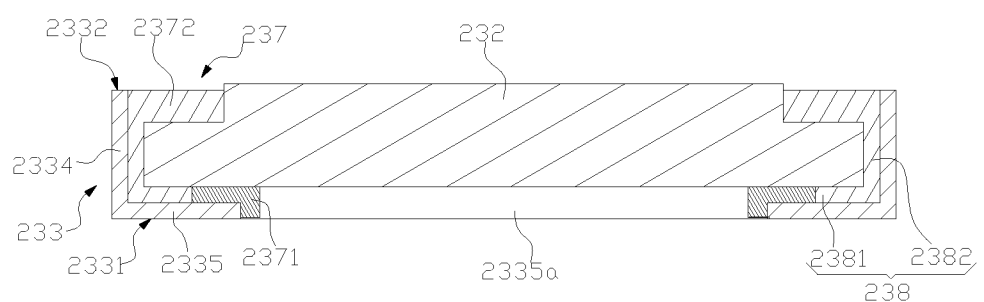
FIG. 13 is a schematic diagram of a connection (indirect connection) between the electrode terminal and the connector provided by some embodiments of the present application.
Figure 14:
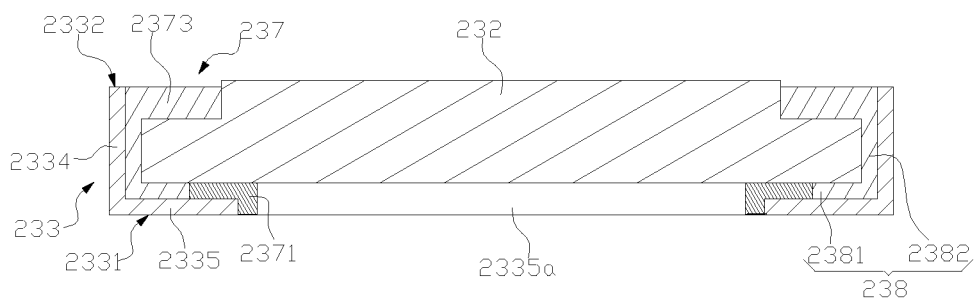
FIG. 14 is a schematic diagram of a connection (indirect connection) between the electrode terminal and the connector provided by some other embodiments of the present application.

In some embodiments, referring to FIGS. 13 and 14, FIG. 13 is a schematic diagram of a connection (indirect connection) between the electrode terminal 232 and the connector 233 provided by some embodiments of the present application, FIG. 14 is a schematic diagram of the connection (indirect connection) between the electrode terminal 232 and the connector 233 provided by some other embodiments of the present application. The end cap assembly 23 further includes a barrier 237 that forms an accommodation gap 238 between an inner contour of the connector 233 and an outer contour of the electrode terminal 232. The barrier 237 is at least partially located in the accommodation gap 238 to block contact between the electrode terminal 232 and the connector 233. That is, the connector 233 is indirectly connected to the electrode terminal 232 through the barrier 237.

In some embodiments, the barrier 237 includes a sealing member 2371 that is at least partially located in the accommodation gap 238 to achieve a sealing connection between the electrode terminal 232 and the connector 233, where the electrolyte (electrolytic solution) in the battery cell 20 is not easily leaked from between the connector 233 and the end cap 231.

As an example, a material of the sealing portion 2371 may be rubber such as polyurethane rubber, acrylate rubber, silicone rubber, and the like.

The barrier 237 may be a portion of the sealing portion 2371 or a whole of the sealing portion 2371.

In some embodiments, the barrier 237 includes an insulating portion 2372, and the insulating portion 2372 is at least partially located in the accommodation gap 238 to achieve the insulating isolation between the electrode terminal 232 and the connector 233.

As an example, a material of the insulating portion 2372 may be plastic, rubber, or the like. The connector 233 may be a conductive member such as copper, iron, aluminum, a plastic part having a conductive function, and the like.

The barrier 237 may be a portion of the insulating portion 2372 or a whole of the insulating portion 2372.

In a non-limiting example, as shown in FIG. 13, the sealing portion 2371 and the insulating portion 2372 are both portions of the barrier 237. In this case, a hardness of the sealing portion 2371 may be smaller than that of the insulating portion 2372, so that the sealing portion 2371 is more easily deformed by a pressing action of the electrode terminal 232 and the connector 233 than the insulating portion 2372, and the sealing portion 2371 has a better sealing effect between the electrode terminal 232 and the connector 233.

The sealing portion 2371 and the insulating portion 2372 may be independent of each other or may be attached together.

In some embodiments, the barrier 237 also includes a conductive portion 2373, the conductive portion 2373 is located at least partially in the accommodation gap 238 to enable the electrical connection of the electrode terminal 232 to the connector 233.

As an example, the conductive portion 2373 may be a conductive member such as copper, iron, aluminum, a plastic part having a conductive function, and the like.

The barrier 237 may be a portion of the conductive portion 2373 or a whole of the conductive portion 2373.

In a non-limiting example, as shown in FIG. 14, the sealing portion 2371 and the conductive portion 2373 are both portions of the barrier 237. The sealing portion 2371 and the conductive portion 2373 may be independent of each other or may be attached together.

In some embodiments, as shown in FIGS. 13 and 14, the connector 233 includes the enclosure 2334 and the first restraint portion 2335, the first restraint portion 2335 is provided on the inner side wall of the enclosure 2334 and disposed in the circumferential direction of the enclosure 2334, the electrode terminal 232 is at least partially located in the enclosure 2334, the first restraint portion 2335 and the electrode terminal 232 form a first gap 2381, the enclosure 2334 and the electrode terminal 232 form a second gap 2382 connected with the first gap 2381, the first gap 2381 and the second gap 2382 each forms a portion of the accommodation gap 238, a portion of the barrier 237 is located in the first gap 2381, and a portion of the barrier 237 is located in the second gap 2382.

A portion of the barrier 237 is located in the first gap 2381 formed by the first restraint portion 2335 and the electrode terminal 232, so that the electrode terminal 232 and the first restraint portion 2335 can abut indirectly. The electrode terminal 232 can abut against the first restraint portion 2335 through the portion of the barrier 237 located in the first gap 2381, so that the first restraint portion 2335 can limit the electrode terminal 232 axially (in the thickness direction Z of the end cap 231). A portion of the barrier 237 is located in the second gap 2382 formed by the enclosure 2334 and the electrode terminal 232, the outer side wall of the electrode terminal 232 indirectly abuts the inner side wall of the enclosure 2334, and the electrode terminal 232 can abut against the enclosure 2334 by a portion of the barrier 237 located in the second gap 2382, so that the enclosure 2334 serves to limit the electrode terminal 232 in a radial direction (a direction perpendicular to the thickness direction Z of the end cap 231).

In some embodiments, as shown in FIG. 13, where both the sealing portion 2371 and the insulating portion 2372 are portions of the barrier 237, the sealing portion 2371 may be at least partially located in the first gap 2381, and the insulating portion 2372 may be at least partially located in the second gap 2382.

As an example, a portion of the insulating portion 2372 may also be located in the first gap 2381, and a portion of the sealing portion 2371 may also be located in the escape hole 2335a defined by the inner side wall of the second restraint portion 2336, with a portion of the sealing portion 2371 located in the escape hole 2335a forming a positioning fit with the escape hole 2335a.

Figure 15:
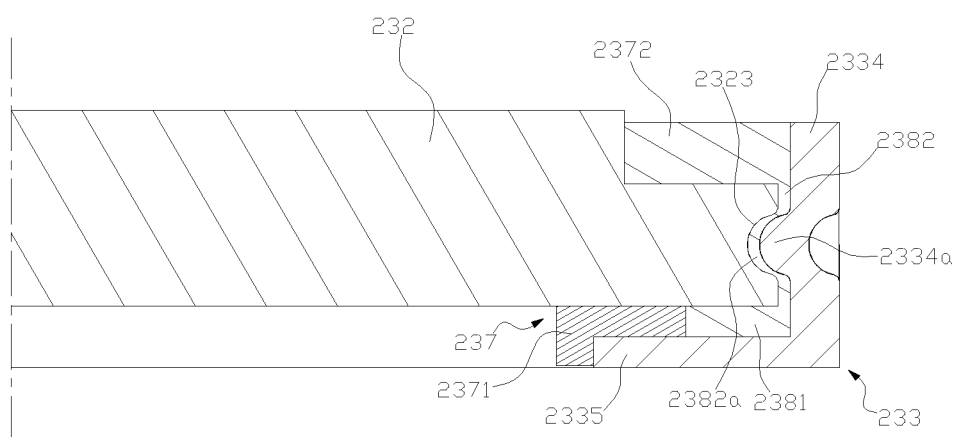
FIG. 15 is a schematic diagram of a connection (indirect connection) between the electrode terminal and the connector provided by some still other embodiments of the present application.

In some embodiments, refer to FIG. 15, FIG. 15 is a schematic diagram of the connection (indirect connection) between the electrode terminal 232 and the connector 233. One of the inner side wall of the enclosure 2334 and the outer side wall of the electrode terminal 232 is provided with an annular protrusion 2334a, the other is provided with an annular recess 2323 in which the annular protrusion 2334a is partially located, a transition gap 2382a is formed between the outer contour of the annular protrusion 2334a and the inner contour of the annular recess 2323, the transition gap 2382a forms a portion of the second gap 2382, and a portion of the barrier 237 is located in the transition gap 2382a.

The annular protrusion 2334a is located locally in the annular recess 2323, and the annular recess 2323 restrains the annular protrusion 2334a and restricts the electrode terminal 232 from moving in a direction away from the first restraint portion 2335.

As an example, as shown in FIG. 15, the annular protrusion 2334a is annularly disposed on the inner side wall of the enclosure 2334 and the annular recess 2323 is annularly disposed on the outer side wall of the electrode terminal 232.

Figure 16:
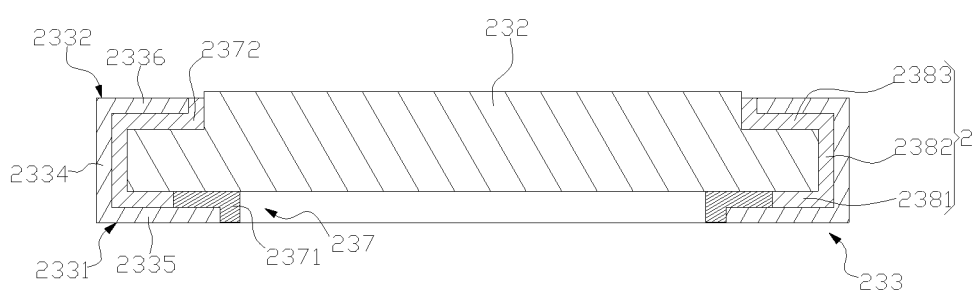
FIG. 16 is a schematic diagram of a connection (indirect connection) between the electrode terminal and the connector provided by some further embodiments of the present application.
Figure 17:
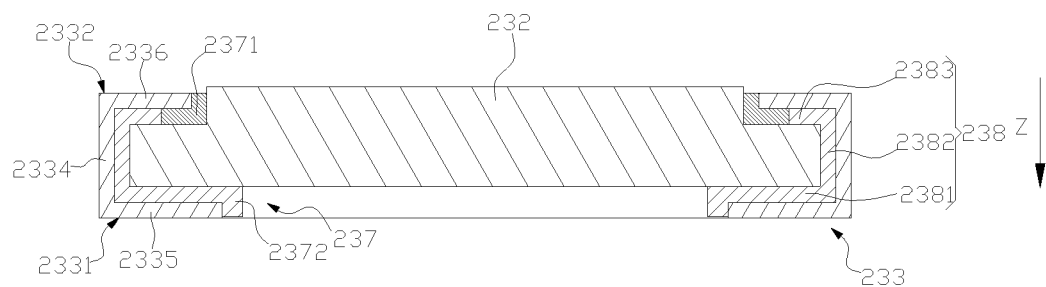
FIG. 17 is a schematic diagram of a connection (indirect connection) between the electrode terminal and the connector provided by some yet further embodiments of the present application.
Figure 18:
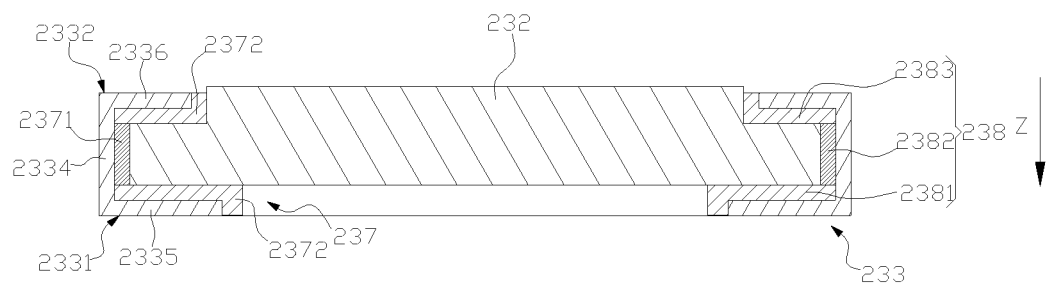
FIG. 18 is a schematic diagram of a connection (indirect connection) between the electrode terminal and the connector provided by some still further embodiments of the present application.

In some embodiments, please refer to FIGS. 16-18, FIG. 16 is a schematic diagram of the connection (indirect connection) between the electrode terminal 232 and the connector 233 provided by some other embodiments of the present application, FIG. 17 is a schematic diagram of the connection (indirect connection) between the electrode terminal 232 and the connector 233 provided by some yet further embodiments of the present application, and FIG. 18 is a schematic diagram of the connection (indirect connection) between the electrode terminal 232 and the connector 233 provided by some still further embodiments of the present application. The connector 233 further includes the second restraint portion 2336 disposed at intervals from the first restraint portion 2335 in the thickness direction Z of the end cap 231. The second restraint portion 2336 is provided on the inner side wall of the enclosure 2334 and is disposed along the circumferential direction of the enclosure 2334. The second restraint portion 2336 and the electrode terminal 232 form a third gap 2383 connected to the second gap 2382. The third gap 2383 forms a portion of the accommodation gap 238, and a portion of the barrier 237 is located in the third gap 2383.

The portion of the barrier 237 is located within the third gap 2383, so that the electrode terminal 232 indirectly abuts the second restraint portion 2336. Both the second restraint portion 2336 and the first restraint portion 2335 can limit the electrode terminal 232 to limit the electrode terminal 232 to move in the axial direction (the thickness direction Z of the end cap 231).

For example, where each of the sealing portion 2371 and the insulating portion 2372 is a portion of the barrier 237, as shown in FIG. 16, at least a portion of the sealing portion 2371 is located in the first gap 2381, and a portion of the insulating portion 2372 is located in the second gap 2382 and the third gap 2383. As shown in FIG. 17, at least a portion of the sealing portion 2371 may be located in the third gap 2383 and a portion of the insulating portion 2372 is located in the first gap 2381 and the second gap 2382. As shown in FIG. 18, at least a portion of the sealing portion 2371 may be located in the second gap 2382, and a portion of the insulating portion 2372 is located in the first gap 2381 and the third gap 2383. For example, the insulating portion 2372 includes two independent sections, one of which is located in the first gap 2381, and the other end is located in the third gap 2383.

Figure 19:
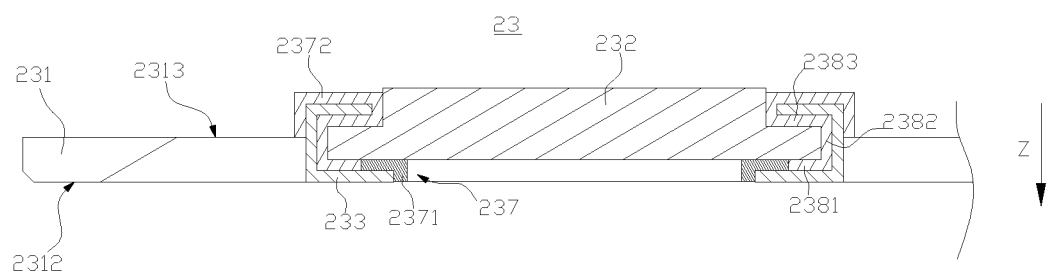
FIG. 19 is a schematic diagram of a connection of the electrode terminal, the connector, and an end cap provided by some embodiments of the present application.

In some embodiments, please refer to FIG. 19, FIG. 19 is a schematic connection diagram of the electrode terminal 232, the connector 233, and the end cap 231 provided by some embodiments of the present application. A portion of the connector 233 is inserted in the electrode lead-out hole 2311, a portion of the connector 233 is located outside the electrode lead-out hole 2311, and a portion of the barrier 237 covers the portion of the connector 233 located outside the electrode lead-out hole 2311, so as to protect the portion of the connector 233 exposed outside the end cap 231.

As an example, the insulating portion 2372 in the barrier 237 covers a portion of the connector 233 beyond the second end face 2313 of the end cap 231 in a direction in which the first end face 2312 of the end cap 231 points to the second end face 2313, so as to increase a creepage distance between the electrode terminal 232 and the end cap 231.

As shown in FIG. 19, the sealing portion 2371 and the insulating portion 2372 are both portions of the barrier 237. At least a portion of the sealing portion 2371 is located in the first gap 2381, and a portion of the insulating portion 2372 is located in the second gap 2382 and the third gap 2383.

It should be noted that the portion of the insulating portion 2372 located in the third gap 2383 and the second gap 2382 and the portion of the insulating portion 2372 covering the outside the electrode lead-out hole 2311 may be an integral structure or may be a separate structure independent of each other.

As can be seen from the above embodiments, the connector 233 can clamp the electrode terminal 232 by cover the outer circumference of the electrode terminal 232 in the circumferential direction. In other embodiments, the connector 233 may also clamp the electrode terminal 232 in other ways. For example, the connector 233 includes two clamping portions disposed opposite each other, and the two clamping portions are clamped on both sides of the electrode terminal 232 in a radial direction (a direction perpendicular to the thickness direction Z of the end cap 231), respectively, thereby clamping and fixing the electrode terminal 232 by the connector 233. Certainly, the connector 233 may also be fixed to the electrode terminal 232 in a non-clamping manner, for example, the connector 233 and the electrode terminal 232 may be connected and fixed by screws bolts, pins, or the like.

Figure 20:
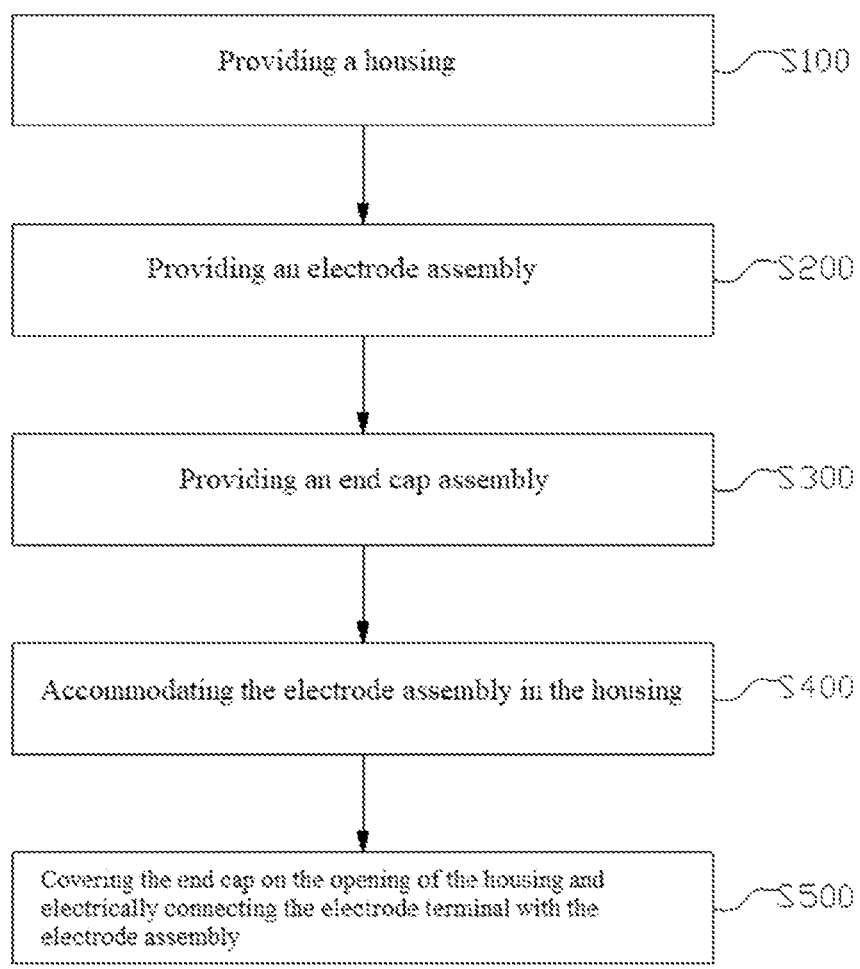
FIG. 20 is a flowchart of a manufacturing method of a battery cell provided by some embodiments of the present application.

Referring to FIG. 20, FIG. 20 is a flow diagram of a method for manufacturing a battery cell 20 provided by some embodiments of the present application, the method includes:

S100: providing a housing 21 including an opening 211;
S200: providing an electrode assembly 22;
S300: providing an end cap assembly 23, where the end cap assembly 23 includes an end cap 231, an electrode terminal 232, and a connector 233, the end cap 231 is provided with an electrode lead-out hole 2311, the electrode lead-out hole 2311 penetrates the end cap 231 in a thickness direction Z of the end cap 231, the electrode terminal 232 is configured to be electrically connected to the electrode assembly 22, and the connector 233 is configured to connect the end cap 231 to fix the electrode terminal 232, where the electrode terminal 232 is provided opposite to the electrode lead-out hole 2311 and a projection of the electrode terminal 232 in the thickness direction Z of the end cap 231 does not overlap with a projection of the end cap 231 in the thickness direction Z;

S400: accommodating the electrode assembly 22 in the housing 21; and

S500: covering the end cap 231 in the opening 211 of housing 21, and electrically connecting the electrode terminal 232 with the electrode assembly 22.

In the above method, the sequence of steps S100, S200 and S300 is not limited. For example, step S300 may be executed first, then step S200 is executed followed by step S100.

For the relevant structure of the battery cell 20 manufactured by the above-described method, please refer to the battery cell 20 provided by the above-described embodiments, and for the electrode assembly 22 in the battery cell 20, please refer to the electrode assembly 22 provided by the above-described embodiments.

Figure 21:
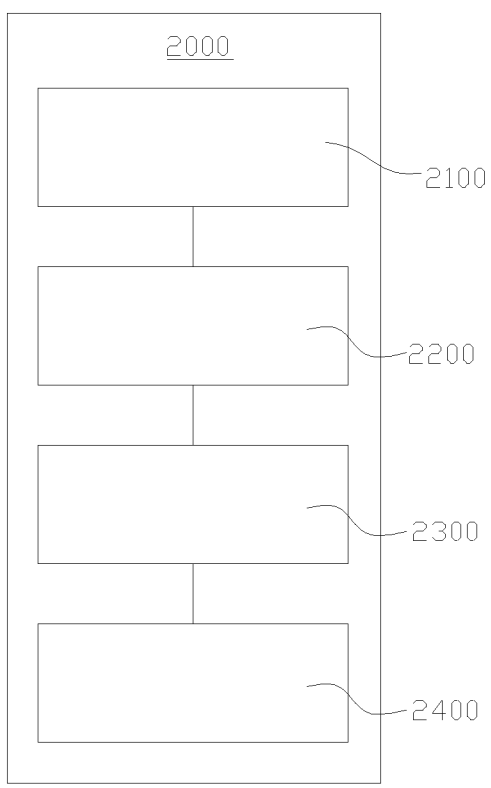
FIG. 21 is a schematic block diagram of a manufacturing equipment of a battery cell provided by some embodiments of the present application.

Referring to FIG. 21, FIG. 21 is a schematic block diagram of a manufacturing equipment 2000 of a battery cell 20 provided by some embodiments of the present application. The embodiments of the present application also provide a manufacturing equipment 2000 of a battery cell 20, and the manufacturing equipment 2000 includes a first providing apparatus 2100, a second providing apparatus 2200, a third providing apparatus 2300 and an assembling apparatus 2400.

The first providing apparatus 2100 is used for providing a housing 21 including an opening 211. The second providing apparatus 2200 is used for providing an electrode assembly 22. The third providing apparatus 2300 is used for providing an end cap assembly 23, the end cap assembly 23 includes an end cap 231, an electrode terminal 232, and a connector 233, the end cap 231 is provided with an electrode lead-out hole 2311, the electrode lead-out hole 2311 penetrates the end cap 231 in a thickness direction Z of the end cap 231, the electrode terminal 232 is configured to be electrically connected to the electrode assembly 22, and the connector 233 is configured to connect the end cap 231 to fix the electrode terminal 232, where the electrode terminal 232 is provided opposite to the electrode lead-out hole 2311, and a projection of the electrode terminal 232 in the thickness direction Z of the end cap 231 does not overlap with a projection of the end cap 231 in the thickness direction Z. The assembling apparatus 2400 is used for accommodating the electrode assembly 22 in the housing 21 and covering the end cap 231 on the opening 211. The electrode terminal 232 is electrically connected with the electrode assembly 22.

For the relative structures of the battery cell 20 manufactured by the above-mentioned manufacturing equipment 2000, please refer to the battery cell 20 provided by the above various embodiments, and for the electrode assembly 22 in the battery cell 20, please refer to the electrode assembly 22 provided by the above various embodiments.

It should be noted that the features in the embodiments of the present application may be combined with each other without conflict.

The above embodiments are used only to illustrate the technical solutions of the present application and are not intended to limit the present application. For those skilled in the art, various modifications and changes can be made to the present application. Any modification, equivalent replacement, improvement, etc. made within the spirit and principles of the present application shall be included in the scope of protection of the present application.

What is claimed is:

1. An end cap assembly for a battery cell, the battery cell comprising an electrode assembly, the end cap assembly comprising:

an end cap provided with an electrode lead-out hole which penetrates the end cap in a thickness direction of the end cap;

an electrode terminal being configured to be electrically connected to the electrode assembly;

a connector being configured to connect the end cap to fix the electrode terminal, wherein the electrode terminal is provided opposite to the electrode lead-out hole, and a projection of the electrode terminal in the thickness direction does not overlap with a projection of the end cap in the thickness direction;

the end cap assembly further comprises a barrier; and an accommodation gap is formed between an inner contour of the connector and an outer contour of the electrode terminal, and the barrier is at least partially disposed in the accommodation gap to block a contact between the electrode terminal and the connector;

the connector comprises an enclosure and a first restraint portion, wherein the first restraint portion is disposed on an inner side wall of the enclosure and arranged along a circumferential direction of the enclosure, the electrode terminal is at least partially located in the enclosure, the first restraint portion and the electrode terminal form a first gap, the enclosure and the electrode terminal form a second gap connected with the first gap, the first gap and the second gap each forms a portion of the accommodation gap, a portion of the barrier is located in the first gap, and a portion of the barrier is located in the second gap;

the connector further comprises a second restraint portion arranged at intervals from the first restraint portion in a thickness direction of the end cap; and the second restraint portion is disposed on the inner side wall of the enclosure and arranged in the circumferential direction of the enclosure, the second restraint portion and the electrode terminal form a third gap connected with the second gap, the third gap forms a portion of the accommodation gap, and a portion of the barrier is located in the third gap.

2. The end cap assembly according to claim 1, wherein the connector clamps the electrode terminal so that the electrode terminal is fixed to the connector.

3. The end cap assembly according to claim 2, wherein the connector covers an outer periphery of the electrode terminal in a circumferential direction so that the connector clamps the electrode terminal.

4. The end cap assembly according to claim 1, wherein the enclosure, the first restraint portion and the second restraint portion together define an accommodation space, and the electrode terminal is at least partially located in the accommodation space.

5. The end cap assembly according to claim 4, wherein the electrode terminal comprises a body portion and a protrusion portion; and the body portion is configured to be electrically connected to the electrode assembly, and the protrusion portion is connected to the body portion and extends into the accommodation space along a direction perpendicular to the thickness direction.

6. The end cap assembly according to claim 5, wherein the first restraint portion is closer to the electrode assembly than the second restraint portion, the inner side wall of the second restraint portion defines an escape hole, and the body portion passes through the escape hole along the thickness direction and extends outside the connector.

7. The end cap assembly according to claim 4, wherein the electrode terminal abuts against the first restraint portion and second restraint portion to restrict movement of the electrode terminal related to the connector in the thickness direction.

8. The end cap assembly according to claim 1, wherein the connector is at least partially inserted in the electrode lead-out hole; and/or,
the electrode terminal is at least partially inserted in the electrode lead-out hole.

9. The end cap assembly according to claim 1, wherein the end cap comprises a first end face and a second end face arranged opposite each other in the thickness direction, the first end face being closer to the electrode assembly than the second end face; and
the connector does not extend beyond the first end face along a direction in which the second end face points to the first end face.

10. The end cap assembly according to claim 9, wherein the connector comprises a third end face and a fourth end face arranged opposite each other in the thickness direction; and
the third end face is flush with the first end face, and the second end face is located between the third end face and the fourth end face in the thickness direction.

11. The end cap assembly according to claim 1, wherein an outer side wall of the connector is provided with an abutment portion, and the abutment portion is configured to abut against the end cap in the thickness direction.

12. The end cap assembly according to claim 11, wherein the end cap is provided with an accommodation groove for accommodating the abutment portion,
the abutment portion is arranged along a circumferential direction of the outer side wall of the connector, and the accommodation groove is arranged around the electrode lead-out hole.

13. The end cap assembly according to claim 12, wherein the end cap comprises a first end face and a second end face arranged opposite each other in the thickness direction, the first end face being closer to the electrode assembly than the second end face; and
the accommodation groove is provided on the first end face or the second end face.

14. The end cap assembly according to claim 1, wherein the barrier comprises a sealing portion; and
the sealing portion is at least partially located in the accommodation gap to achieve a sealing connection between the electrode terminal and the connector;
wherein the barrier comprises an insulating portion; and
the insulating portion is at least partially located in the accommodation gap to achieve an insulating isolation between the electrode terminal and the connector;
wherein the barrier comprises a conductive portion; and
the conductive portion is at least partially located in the accommodation gap to achieve an electrical connection between the electrode terminal and the connector.

15. The end cap assembly according to claim 1, wherein a portion of the connector is inserted in the electrode lead-out hole and a portion of the connector is located outside the electrode lead-out hole; and
a portion of the barrier covers a portion of the connector outside the electrode lead-out hole.

16. A battery cell comprising:
a housing comprising an opening;
an electrode assembly accommodated in the housing; and
an end cap being configured to cover the opening, and the electrode terminal being configured to be electrically connected to the electrode assembly, the end cap assembly comprising:
an end cap provided with an electrode lead-out hole which penetrates the end cap in a thickness direction of the end cap;
an electrode terminal being configured to be electrically connected to the electrode assembly;
a connector being configured to connect the end cap to fix the electrode terminal,
wherein the electrode terminal is provided opposite to the electrode lead-out hole, and a projection of the electrode terminal in the thickness direction does not overlap with a projection of the end cap in the thickness direction;
the end cap assembly further comprises a barrier; and
an accommodation gap is formed between an inner contour of the connector and an outer contour of the electrode terminal, and the barrier is at least partially disposed in the accommodation gap to block a contact between the electrode terminal and the connector;
the connector comprises an enclosure and a first restraint portion, wherein
the first restraint portion is disposed on an inner side wall of the enclosure and arranged along a circumferential direction of the enclosure, the electrode terminal is at least partially located in the enclosure, the first restraint portion and the electrode terminal form a first gap, the enclosure and the electrode terminal form a second gap connected with the first gap, the first gap and the second gap each forms a portion of the accommodation gap, a portion of the barrier is located in the first gap, and a portion of the barrier is located in the second gap;
the connector further comprises a second restraint portion arranged at intervals from the first restraint portion in a thickness direction of the end cap; and
the second restraint portion is disposed on the inner side wall of the enclosure and arranged in the circumferential direction of the enclosure, the second restraint portion and the electrode terminal form a third gap connected with the second gap, the third gap forms a portion of the accommodation gap, and a portion of the barrier is located in the third gap.

17. A battery comprising:
a box body; and
the battery cell according to claim 16, the battery cell being accommodated in the box body.

* * * * *